United States Patent [19]

Fergason

[11] Patent Number: 4,613,207

[45] Date of Patent: Sep. 23, 1986

[54] LIQUID CRYSTAL PROJECTOR AND METHOD

[75] Inventor: James L. Fergason, Atherton, Calif.

[73] Assignee: Manchester R & D Partnership, Pepper Pike, Ohio

[21] Appl. No.: 608,135

[22] Filed: May 8, 1984

[51] Int. Cl.$^4$ .............................................. G02F 1/13
[52] U.S. Cl. .................. 350/331 R; 350/334; 350/339 F
[58] Field of Search ................. 350/331 R, 339 F, 351

[56] References Cited

U.S. PATENT DOCUMENTS

| | | | |
|---|---|---|---|
| 3,600,060 | 8/1971 | Churchill et al. | 350/351 X |
| 3,844,650 | 10/1974 | Nicholson et al. | 350/331 R X |
| 4,279,152 | 7/1981 | Crossland | 350/351 X |
| 4,294,524 | 10/1981 | Stolov | 350/339 F X |
| 4,435,047 | 3/1984 | Fergason | 350/334 |

FOREIGN PATENT DOCUMENTS 2139537  1/1973  France ............................ 350/339 R

*Primary Examiner*—John K. Corbin
*Assistant Examiner*—Richard F. Gallivan
*Attorney, Agent, or Firm*—Renner, Otto, Boisselle & Lyon

[57] ABSTRACT

A liquid crystal image forming projector includes a liquid crystal display selectively operable for affecting light incident thereon, and an optical device for selectively projecting light affected or not affected by the liquid crystal display. The liquid crystal display, for example, selectively transmits light and at least one of scatters and absorbs light, and the optical device includes a projection lens for projecting light to form an image that is a function of selective operation of said liquid crystal display and a selecting device, such as a mask or aperture, for selecting the light from the liquid crystal display for projection to form such image. A method for projecting an image also is disclosed and includes directing incident light to a liquid crystal device capable of affecting or not affecting such incident light, and selectively projecting light affected or not affected by such liquid crystal device to form an image. The projected light may be colored, for example using a selectively operable liquid crystal filter and/or a liquid crystal display that colors light incident thereon.

104 Claims, 21 Drawing Figures $$\frac{1}{S_1} + \frac{1}{S_2} = \frac{1}{f}$$

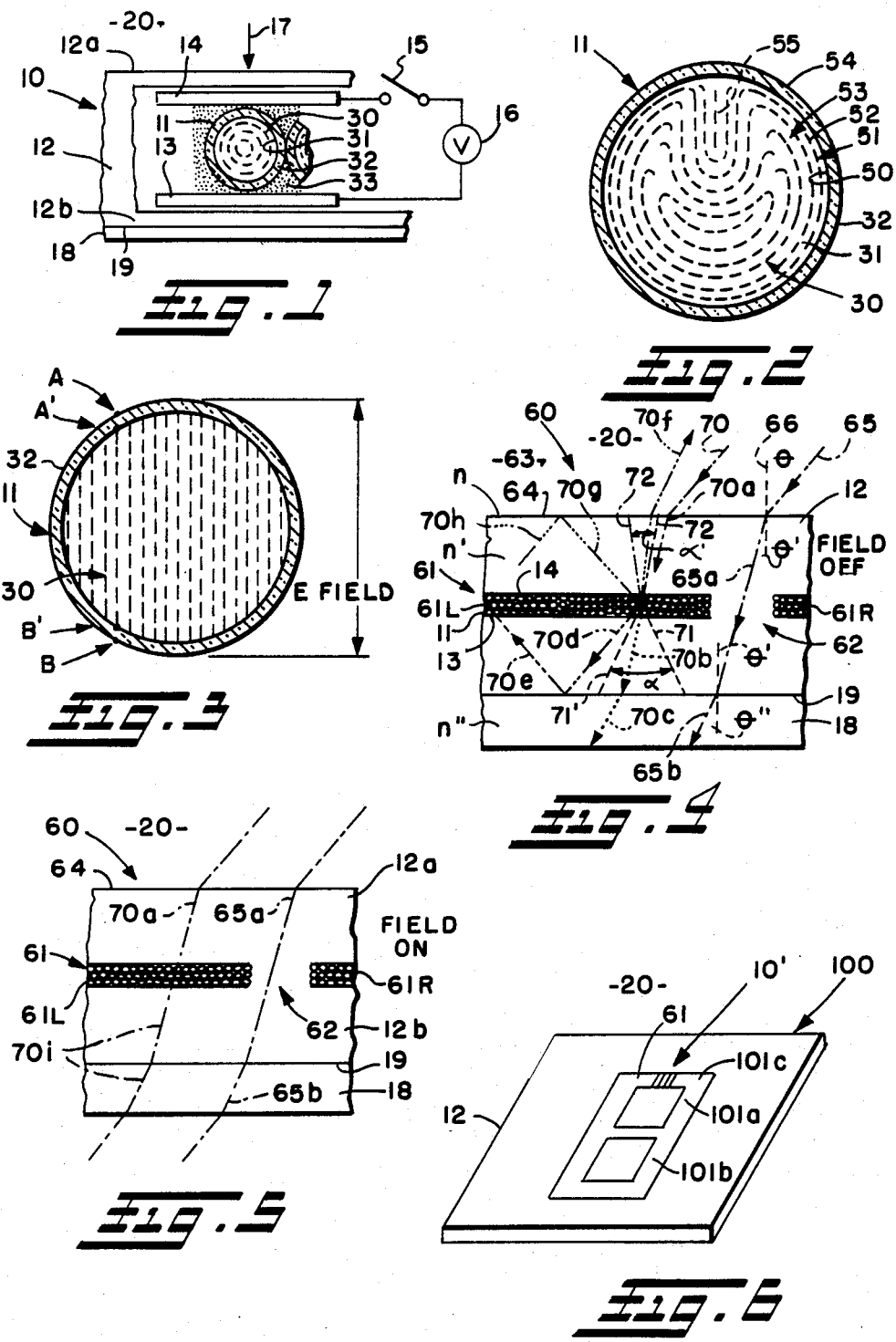

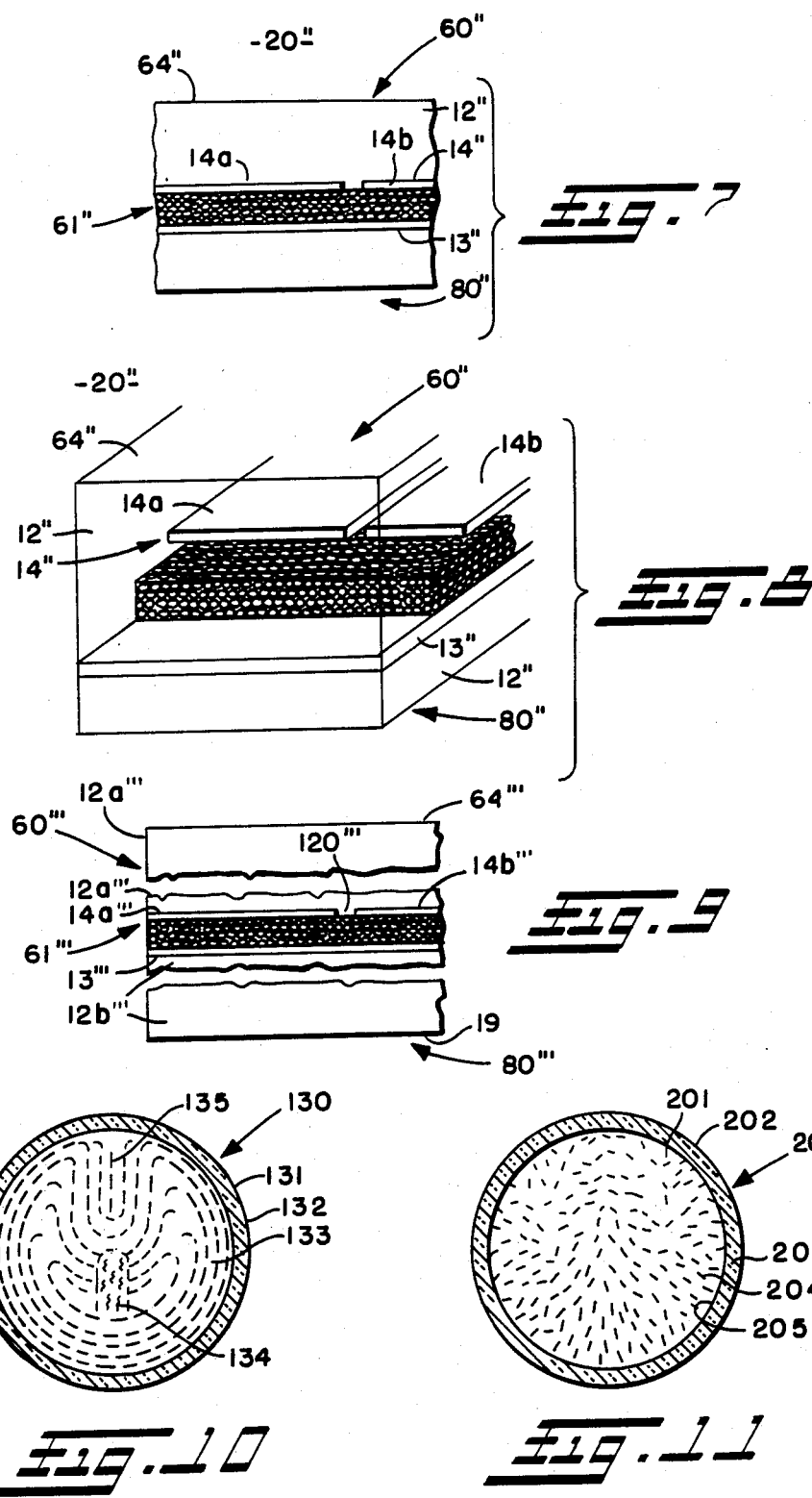

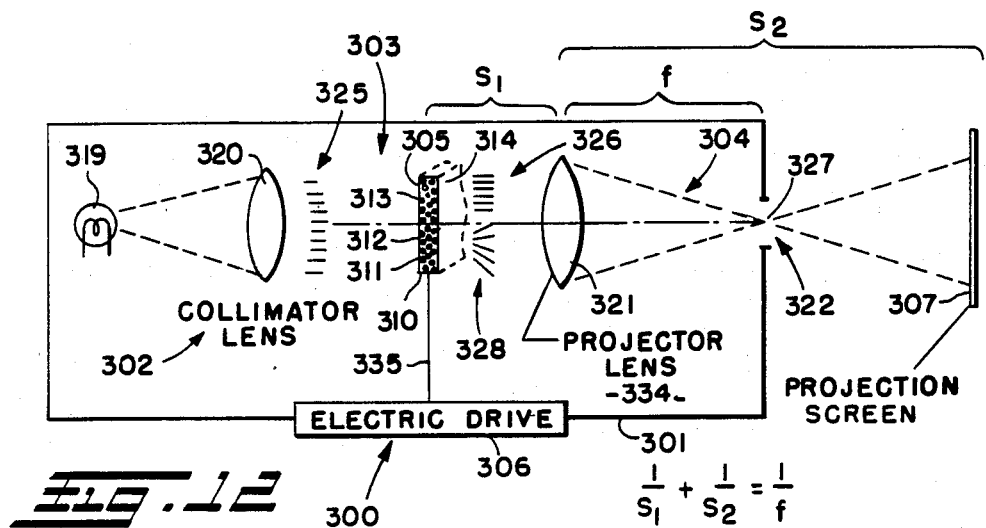
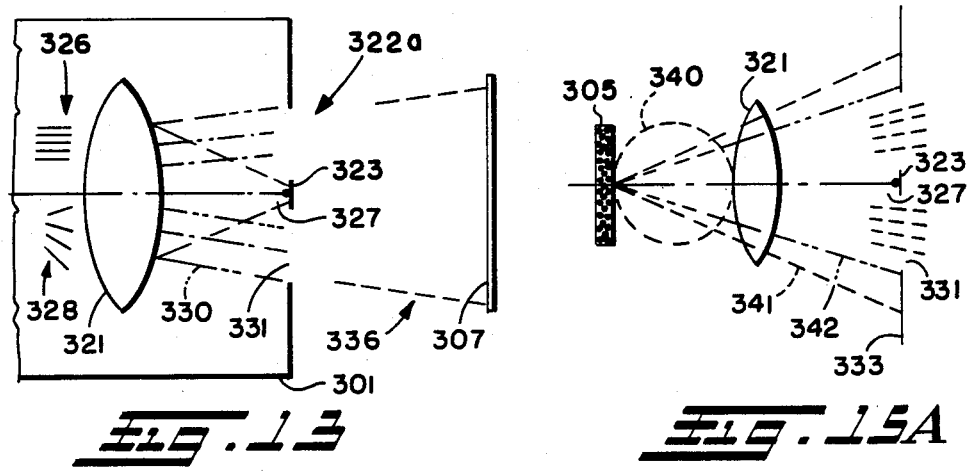
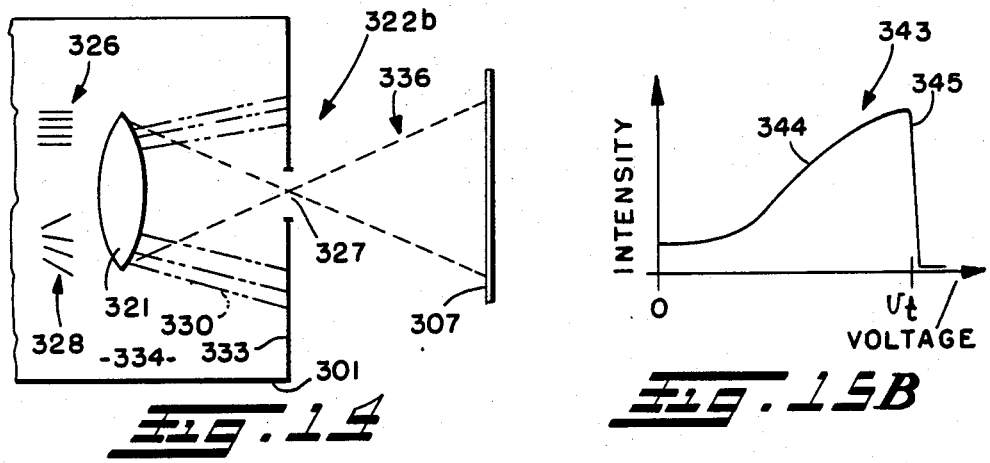

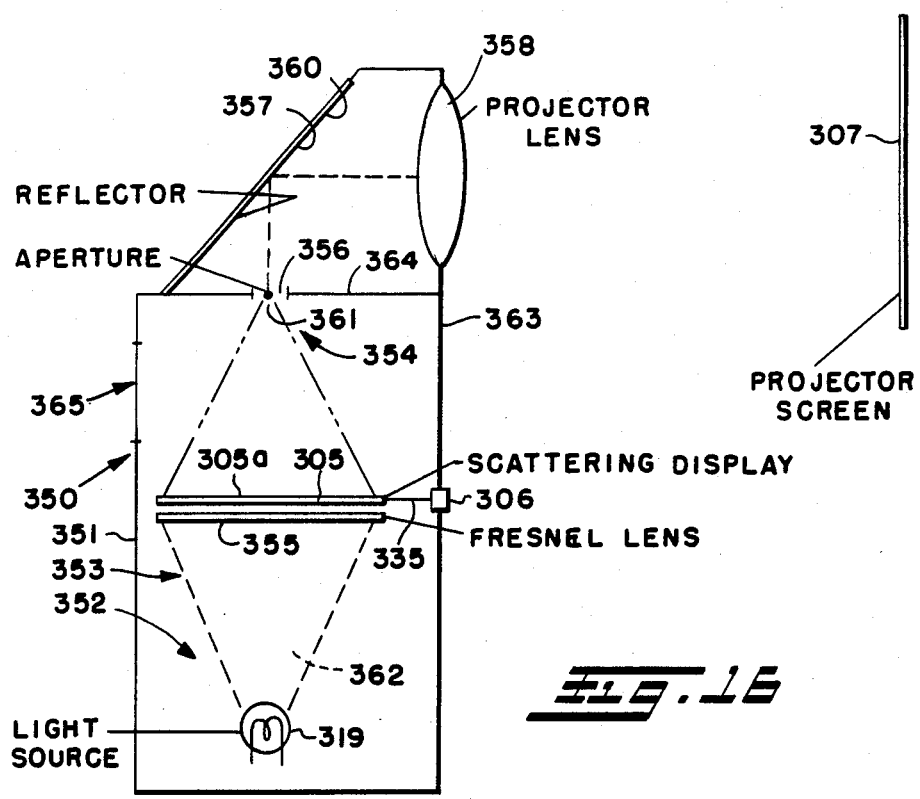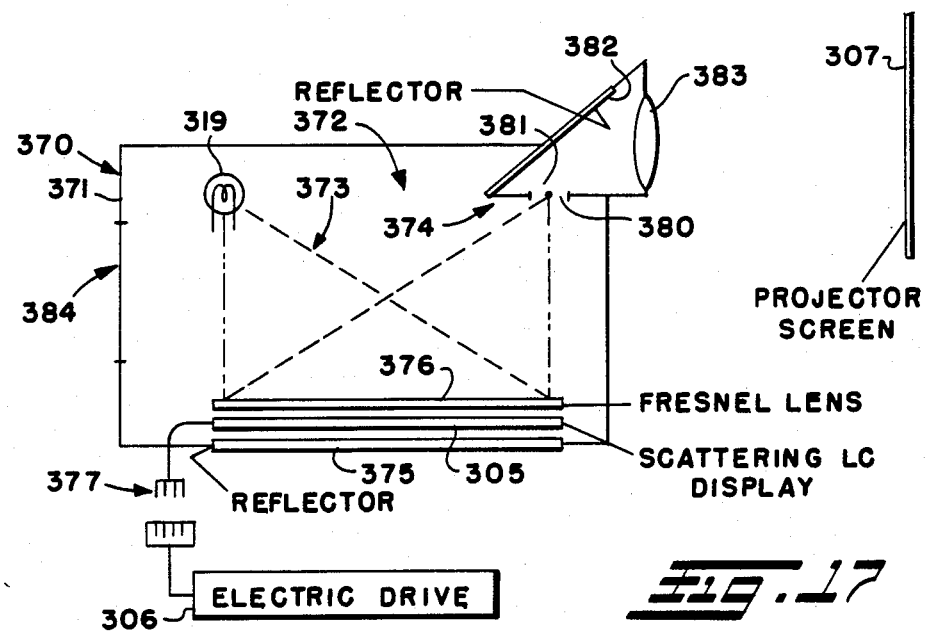

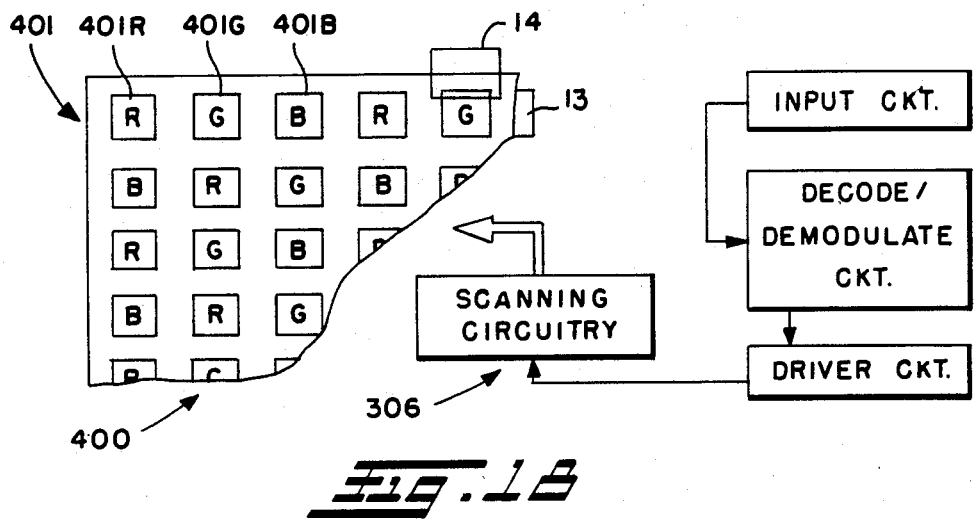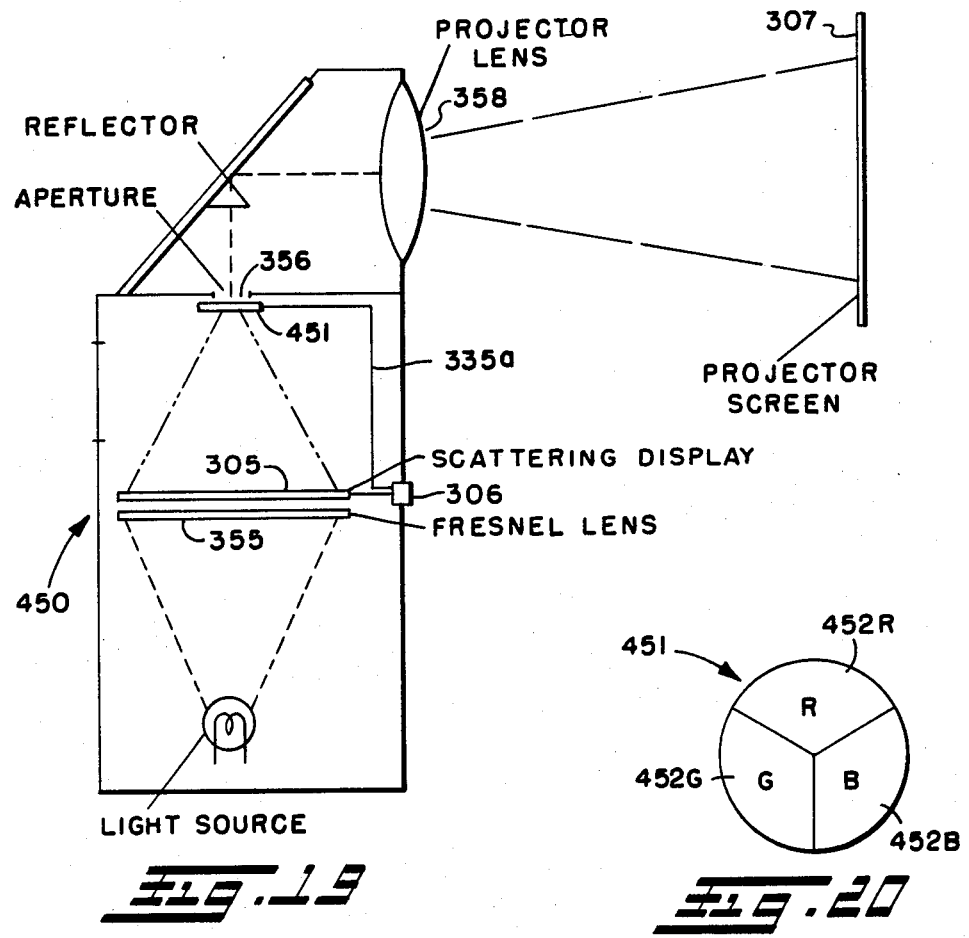

LIQUID CRYSTAL PROJECTOR AND METHOD

CROSS REFERENCE TO RELATED APPLICATIONS

Reference is made to applicant's commonly assigned, U.S. Pat. No. 4,435,047, issued Mar. 6, 1984, for "Encapsulated Liquid Crystal and Method"; and copending U.S. patent application Ser. No. 477,138 for "Enhanced Scattering in Voltage Sensitive Encapsulated Liquid Crystal" and Ser. No. 477,242 for "Encapsulated Liquid Crystal and Method", both filed Mar. 21, 1983; Ser. No. 480,461 for "Colored Encapsulated Liquid Crystal Devices Using Imbibition of Colored Dyes and Scanned Multicolor Displays" and Ser. No. 480,466 for "Colored Encapsulated Liquid Crystal Apparatus using Enhanced Scattering", both filed Mar. 30, 1983; and Ser. No. 477242 for "Encapsulated Liquid Crystal Material, Apparatus and Method", filed Mar. 2, 1984; the entire disclosures of such applications hereby are incorporated by reference.

TECHNICAL FIELD

The present invention relates generally to projectors and, more particularly, to a liquid crystal projector and method. In one embodiment of the invention light incident on a liquid crystal display-type device selectively is scattered or transmitted by respective portions of the liquid crystal display, and a projection mechanism projects an image formed by either such scattered light or such transmitted light.

BACKGROUND

A conventional optical projector may include a light source, an input image device holder, such as a glass plate on which a slide or transparency may be placed for illumination by light from the light source, and a lens system for projecting an image of the illuminated slide or transparency. Typically the slide or transparency would have optically transparent portions and optically absorbent, e.g. black, portions. When projected onto a screen, such black portions appear black due to absorption of light by the light absorbing, e.g. black emulsion, material on the slide or transparency, and the optically transmissive portions would appear relatively bright on the screen. A common exemplary projection is known as an overhead projector which often is used during classes, lectures, presentations, and the like; overhead projectors often are used to project images of alphanumeric, graphical, or other information written or printed on the transparency, and provision, too, often is made to enable a lecturer, for example, to write directly on the transparency while used in the projector.

One problem with such conventional projectors is the large amount of heat that is absorbed by the light absorbing portions of the slide or transparency, which could cause destruction or damage to the latter; to minimize such heat build-up it often is necessary to use one or more infrared or heat absorbing filters optically upstream of the slide or transparency. The heat dissipated in the heat filters and at the optical source or cabinet containing the same requires elimination, for example by a blower or other means. The blower may produce undesirable noise and/or vibration and uses energy that would not have to be consumed if the heat did not require such elimination. Another disadvantage with conventional overhead projectors is that the hot surface of the transparency often is difficult to write on by the lecturer. A further disadvantage of such conventional overhead projectors is the diffraction of light at the interface between light absorbing material, such as a black emulsion, and transparent material of the transparency or slide; such diffraction can reduce the contrast and quality of the projected image seen on a screen. Furthermore, in conventional film projectors, contrast would be reduced since images are formed in part, at least, by the blockage of light, and such blockage is a function of absorption, which can vary, depending on the quality of opaqueness of the blocking material.

Liquid crystal material currently is used in a wide variety of devices, including, for example, optical devices such as visual displays. A property of liquid crystals enabling use in visual displays is the ability to scatter and/or to absorb light when the liquid crystals are in a random alignment and the ability to transmit light when the liquid crystals are in an ordered alignment.

Frequently a visual display using liquid crystals displays dark characters on a gray or relatively light background. In various circumstances it would be desirable, though, using liquid crystal material to be able to display with facility relatively bright characters of other information, etc. on a relatively dark background. It would be desirable as well to improve the effective contrast between the character displayed and the background of the display itself.

An example of electrically responsive liquid crystal material and use thereof is found in U.S. Pat. No. 3,322,485. Certain types of liquid crystal material are responsive to temperature, changing the optical characteristics, such as the random or ordered alignment of the liquid crystal material, in response to temperature of the liquid crystal material.

Currently there are three categories of liquid crystal materials, namely cholesteric, nematic and smectic. The present invention preferably uses nematic liquid crystal material or a combination of nematic and some cholesteric type. More specifically, the liquid crystal material preferably is operationally nematic, i.e. it acts as nematic material and not as the other types. Operationally nematic means that in the absence of external fields structural distortion of the liquid crystal is dominated by the orientation of the liquid crystal at its boundaries, e.g. with a surface, such as the surface of a capsule-like volume, rather than bulk effects, such as very strong twists as in cholesteric material, or layering as in smectic material. Thus, for example, chiral ingredients which induce a tendency to twist but cannot overcome the effects of boundary alignment still would be operationally nematic. Such material should have a positive dielectric anisotropy. Although various characteristics of the various liquid crystal materials are described in the prior art, one known characteristic is that of reversibility. Particularly, nematic liquid crystal material is known to be reversible, but cholesteric material ordinarily is not reversible.

It is also known to add pleochroic dyes to the liquid crystal material. One advantage to using pleochroic dye with the liquid crystal material is the eliminating of a need for a polarizer. However, in the nematic form a pleochroic device has relatively low contrast. In the past cholesteric material could be added to the nematic material together with the dye to improve contrast ratio. See for example the White et al article in *Journal* of Applied Physics, Vol. 45, No. 11, November 1974, at pages 4718–4723. However, although nematic material is reversible, depending on whether or not an electric field is applied across the same, cholesteric material ordinarily would not tend to its original zero field form when the electric field would be removed. Another disadvantage to use of pleochroic dye in solution with liquid crystal material is that the absorption of the dye is not zero in the field-on condition; rather, absorption in the field-on condition follows an ordering parameter, which relates to or is a function of the relative alignment of the dyes.

Usually liquid crystal material is anisotropic both optically (birefringence) and, for example in the case of nematic material, electrically. The optical anisotropy is manifest by the scattering of light when the liquid crystal material is in random alignment, and the transmission of light through the liquid crystal material when it is in ordered alignment. The electrical anisotropy may be a relationship between the dielectric constant or dielectric coefficient with respect to the alignment of the liquid crystal material.

In the past, devices using liquid crystals, such as visual display devices, have been relatively small. Use of encapsulated liquid crystals disclosed in applicant's above mentioned co-pending applications has enabled the satisfactory use of liquid crystal in relatively large size displays, such as billboards, etc., as is disclosed in such applications; and another large (or small) scale use may be as an optical shutter to control passage of light from one area into another, say at a window or window-like area of a building. The present invention relates to improvements in such encapsulated liquid crystals and to the utilization of the light scattering characteristic of the liquid crystal material as opposed, for example, to the light absorption (usually with pleochroic dye) characteristic thereof. The invention also relates to the use of such material and characteristics, for example, to obtain a relatively bright character or information displayed on a relatively dark or colored background in both small and large displays as an optical shutter, and so on. Such large displays and shutters may be about one square foot surface area or even larger. In accordance with the present invention the liquid crystal material most preferably is of the encapsulated type.

As used herein with respect to the present invention, encapsulated liquid crystal material means liquid crystal material in a substantially closed containment medium, such as discrete capsules or cells, and preferably may be in the form of an emulsion of the liquid crystal material and the containment medium. Such emulsion should be a stable one. Various methods for making and using encapsulated liquid crystal material and apparatus associated therewith are disclosed below and in applicant's co-pending application, which is incorporated by reference.

BRIEF SUMMARY OF INVENTION

Briefly, the invention employs a liquid crystal display type of device to affect light incident thereon thereby creating an image or characteristics of an image which can be projected using an optical projection arrangement. In a preferred embodiment the liquid crystal material is capable of transmitting or scattering light which is incident thereon. The image or characteristics of an image are created by determining which portions of the liquid crystal display are to transmit light and which are to scatter light, for example by selective application of an electric field or other prescribed input to respective portions of the liquid crystal display. The liquid crystal display itself may be relatively small or large depending on the desired resolution and contrast of the viewed projected output image, whether it is intended for a person to be able to write on the display or on a protective film positioned in proximity thereto, the capability of the lenses and projecting optics, etc. The projection optics may include an aperture intended to block scattered light and to transmit light which is essentially transmitted through the liquid crystal display for focusing and/or projection onto a screen or other surface on which the projected image is formed. Alternatively, the projection optics may include a mask which blocks the transmitted light and lens which gathers or collects the scattered light for projection onto the screen as the viewable projected image.

Advantageous features inuring to the invention include improved contrast, coolness of operation, and versatility of the display and image. Contrast is improved over prior art photographic and transparency film displays, for example, because light is not absorbed by an emulsion or other absorbing material on the transparency; rather, in the invention light is scattered and blocked, not being permitted to pass through the aperture or is focused and blocked by a mask. Since light intentionally preferably is not absorbed by the liquid crystal display of the invention, heat energy does not have to be dissipated by the light absorbing material; therefore, the overall operation of the projector is cooler, the writing surface, if there were one, would be cooler and easier to use than a hot surface, a separate blower and/or heat filters could be eliminated, the potential of head damage to the display is minimized, etc. Versatility of the projector according to the invention resides, for example, in the ability conveniently to change the phase of the image, for example, conveniently being able to project bright characters on a dark background or vice versa as well as the ability conveniently to change the image by changing the electrical input to the liquid crystal display and, therefore, controlling which portions of the display scatter and which portions transmit light. Also, color filters conveniently can be added at the light output of the projector.

The liquid crystal display taking the place of the transparency or slide, for example, in the projector of the invention, preferably has the ability to effect isotropic scattering of light or to transmit light. The display is formed of plural volumes of liquid crystal material in a containment medium. Those volumes may be fluidically isolated or interconnected or both. Preferably the liquid crystal material is nearly completely isotropically scattering when in distorted or curvilinear alignment; at least such liquid crystal material preferably effects as much isotropic scattering as is possible. Isotropic scattering means that when a beam of light enters the liquid crystal material there is virtually no way to predict the exit angle of scattered light. On the other hand, in the presence of the prescribed input, such as an electric field, the liquid crystal structure tends to align with respect to the field and effectively becomes optically transparent.

The liquid crystal also may include pleochroic dye if absorption characteristics are desired. Also, the liquid crystal and/or the containment or support medium may include non-pleochroic dye for coloring light transmitted therethrough. Further a liquid crystal color filter having only one color or multiple colors may be used to color light projected by the projector.

As it is used herein with respect to the invention, the terms distorted alignment, random alignment, curvilinear alignment and field-off condition mean essentially the same thing; namely, that the directional orientation of the liquid crystal molecules or structure is distorted to an effectively curved configuration. Such distortion is effected, for example, by the wall of respective capsules. The particular distorted alignment of liquid crystal material in a given capsule usually always will be substantially the same in the absence of an electric field.

On the other hand, as it is used herein with respect to the invention, parallel aligned, ordered alignment, and field-on condition means that the liquid crystal material in a capsule is generally aligned with respect to an externally applied electric field.

Briefly, the liquid crystal apparatus includes liquid crystal material for selectively primarily scattering or transmitting light in response to a prescribed input and a containment or support medium for holding therein the liquid crystal material, thus forming volumes of liquid crystal material. In accordance with a preferred embodiment and best mode of the invention, the liquid crystal material is of the encapsulated type that will cause substantially isotropic scattering of light incident thereon, including the scattering of some of such light back in the viewing direction toward, for example, the eye of an observer. More preferably, such liquid crystal is operationally nematic, has a positive dielectric anisotropy, and has an ordinary index of refraction that substantially matches that of the containment or encapsulating medium therefor.

In one embodiment, a large quantity of light that is isotropically scattered by the liquid crystal material is totally internally reflected by the support medium back to the liquid crystal material thereby illuminating the same and causing further isotropic scattering and brightening of the appearance of the liquid crystal material, for example to the eye of an observer. The internal reflectance characteristic of the support medium may be effected by the interface of such back surface with another medium, such as a solid, liquid, or gas, even including air, with the constraint that the index of refraction of the support medium is greater than the index of refraction of such other medium. The support medium may be comprised of several components, including, for example, the containment/encapsulating material (or that with which the liquid crystal material is in emulsion), additional quantities of such encapsulating or other material, a mounting medium, such as a plastic-like film or glass, etc., all of which will be described in further detail below.

The back surface of the support medium may be optically transmissive so that light that reaches such surface in a direction substantially normal thereto will be transmitted. In one embodiment a reflector may be located at such back surface. Ordered alignment of the liquid crystal material will at least substantially eliminate the isotropic scattering so that substantially all the light passing through the liquid crystal material will also pass through the support medium.

Incident illumination for a liquid crystal display embodying the invention may be from the front, viewing or projecting side. Alternatively, incident illumination may be from the back side, i.e. that more remote from the screen, etc., or where it is desired to project an image.

Moreover, a cholesteric material may be added to the nematic liquid crystal material to expedite return of the latter to distorted alignment pattern following in general the configuration of the capsule or cell wall when the electric field is turned off, especially when the capsules are relatively large. Also, if desired, a viscosity controlling additive may be mixed with the liquid crystal. Further, an additive to the liquid crystal may be used to help force a preferred alignment of the liquid crystal structure in a capsule.

These and other embodiments of the invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

In the annexed drawings:

FIG. 1 is a schematic representation of a liquid crystal device in accordance with the present invention;

FIGS. 2 and 3 are enlarged schematic illustrations of a liquid crystal capsule in accordance with the present invention respectively under a no-field or field-off condition and under an applied electric field or field-on condition;

FIGS. 4 and 5 are schematic representations of a liquid crystal apparatus according to one embodiment of the invention, respectively in a no-field condition and in an applied electric field condition;

FIG. 6 is an isometric view of a liquid crystal display apparatus in accordance with the present invention and which may be formed of any of the embodiments disclosed herein;

FIG. 7 is a fragmentary schematic elevation view of another embodiment of liquid crystal apparatus using continuous layers of liquid crystal material and interrupted electrodes;

FIG. 8 is a schematic isometric view, partly broken away, of the embodiment of FIG. 7;

FIG. 9 is a schematic view of an approximately proportioned liquid crystal display according to the invention showing a more accurately representative size relationship of the support medium layers and encapsulated liquid crystal layer for the several embodiments herein;

FIG. 10 is a schematic illustration of a nematic liquid crystal capsule with cholesteric material additive, which may be used with the several embodiments herein;

FIG. 11 is a schematic illustration like FIGS. 2 and 3 showing an alternate embodiment of encapsulated liquid crystal;

FIG. 12 is a schematic illustration of a liquid crystal projector in accordance with the present invention;

FIGS. 13 and 14 are fragmentary schematic illustrations of alternate light output mechanisms used in connection with the projection lens in the projector of FIG. 12;

FIGS. 15A and 15B are, respectively, a schematic representation of light scattered by the liquid crystal display of FIG. 13 and a graph of intensity of projected light as a function of electrical input magnitude;

FIG. 16 is a schematic illustration of a folded liquid crystal projector in accordance with the preferred embodiment and best mode of the invention;

FIG. 17 is a schematic illustration of a double or compound folded liquid crystal projector in accordance with the invention;

FIG. 18 is a dyed display for use in the several projector embodiments;

FIG. 19 is a view of a projector like that of FIG. 16 but with a dynamic color filter; and FIG. 20 is a plan view of the dynamic color filter.

DETAILED DESCRIPTION

The detailed description of several embodiments of liquid crystal projector and method of projecting light using the same are described with reference to FIGS. 12-20 near the latter portion of the text of this application. Initially, though, a detailed description of the liquid crystal display will be presented. It is noted that reference to liquid crystal display here means a liquid crystal device capable of selective operation to affect or not to affect light incident thereon regardless of whether the results of such affectation of light by the liquid crystal may or may not be visible by direct observation of the liquid crystal material by an observer, although it is intended that such results be capable of being operated on optically to result ultimately in projection of an image of alphanumeric, graphical, or other information, etc.

Referring in detail to the drawings, wherein like reference numerals designate like parts in the several figures, and initially to FIGS. 1, 2 and 3, encapsulated liquid crystal material used in accordance with the present invention is illustrated. In FIG. 1 is a schematic representation of a liquid crystal apparatus 10 in accordance with the present invention. The apparatus 10 includes encapsulated liquid crystal material 11 represented by a single capsule in FIGS. 1-3. Although the capsules illustrated in the drawings are shown in two dimensions and, therefore, planar form, it will be appreciated that the capsules are three dimensional, most preferably spherical. The capsule 11 is shown mounted in a preferably transparent support medium 12 having upper and lower portions 12a, 12b which may be integral with each other. The apparatus 10 also includes a pair of electrodes 13, 14 for applying an electric field across the liquid crystal material when a switch 15 is closed to energize the electrodes from a conventional voltage source 16. Reference herein to capsule, capsules, encapsulated liquid crystal, etc. means volumes of liquid crystal material in a containment medium.

A primary feature of the present invention is that such encapsulated liquid crystal material will isotropically scatter light impinging thereon when in a field-off random alignment condition; and in the field-on orderly aligned condition, such material will be substantially optically transparent.

It is to be understood that the capsule 11 may be one of many capsules that are discretely formed or, more preferably, that are formed by mixing the liquid crystal material with a so-called encapsulating material or containment medium to form an emulsion, preferably a stable one. The capsules may be fluidically interconnected with other capsules or fluidically isolated from each other or both types of interconnected and isolated capsules may exist. The emulsion may be applied to or sandwiched between the support media portions 12a, 12b and electrodes 13, 14, as illustrated. If desired, the support medium 12 and the so-called encapsulating material or containment medium may be the same material. As a further alternative, the upper and lower support medium portions 12a, 12b, or one of them, may be a plastic-like, glass, or like, preferably transparent, mounting material. In this latter case the electrodes 13, 14 may be applied to such mounting material and the encapsulated liquid crystal material/emulsion, including many capsules 11, for example, may be sandwiched between such mounting material 12a, 12b to form the apparatus 10, as will be described in further detail below.

A medium 18 forms an interface 19 with the lower support medium portion 12b to obtain a total internal reflection function, if desired, which will be described in greater detail below. Suffice it to say here, though, that due to the total internal reflection principle of operation, the liquid crystal material in the capsule 11 will be illuminated by incident light, for example represented by a light beam 17, and with light that it isotropically scatters in the apparatus 10 so that from the viewing area 20 beyond the upper support medium portion 12a, the liquid crystal material 11 will appear white or relatively bright when under a no-field condition, e.g. the switch 15 is open. Although such isotropic scattering (and some absorption, especially with a pleochroic dye present in the encapsulated liquid crystal materail) occurs in applicant's invention disclosed in the above U.S. Pat. No. 4,435,047, the total internal reflection principle of the present invention enhances scattering and, thus, brightens the visual/optical appearance of characters formed by the encapsulated liquid crystal material. Such total internal reflection, though, is less important to the present invention than is the desired ability selectively to scatter or to transmit light.

The electrode 13 may be, for example, a quantity of vacuum deposited indium tin oxide applied to the lower support medium portion 12b, and the electrode 14 may be, for example, electrically conductive ink applied directly to the liquid crystal material or could be like the electrode 13. Other electrode material and mounting means therefor also may be used for either electrode. Examples include tin oxide and antimony doped tin oxide. Preferably the electrodes are relatively thin, for example, about 200 angstroms thick, and transparent so that they do not significantly affect the optics of the liquid crystal apparatus 10.

The encapsulated liquid crystal material 11 includes liquid crystal 30 contained within the confines or interior volume 31 of a capsule 32. Each capsule 32 may be a discrete one isolated fluidically from other capsules or connected fluidically with one or more other capsules; or alternatively the liquid crystal 30 may be contained in a stable emusion of a containment medium or so-called encapsulating material 33 that ends to form a multitude of capsule-like environments for containing the liquid crystal material. For convenience of illustration, the capsules 32 are shown as discrete capsules in and preferably formed of the overall quantity of containment medium or encapsulating material 33. According to the preferred embodiment and best mode of the present invention, the capsule 32 is generally spherical, and the liquid crystal 30 is nematic or operationally nematic liquid crystal material having positive dielectric anisotropy. However, the principles of the invention would apply when the capsule 32 is of a shape other than spherical; such shape should provide the desired optical and electrical characteristics that will satisfactorily coact with the optical characteristics of the liquid crystal material 30, e.g. index of refraction, and will permit an adequate portion of the electric field to occur across the liquid crystal 30 itself for effecting desired ordered or parallel alignment of the liquid crystal when it is desired to have a field-on condition. The shape also should tend to distort the liquid crystal material when in a field-off or random alignment condition. A particular advantage to the preferred spherical configuration of the capsule 32 is the distortion it effects on the liquid crystal 30 therein when in a field-off condition. This distortion is due, at least in part, to the relative sizes of the capsules and the pitch of the liquid crystal; they preferably are about the same or at least about the same order of magnitude. Moreover, nematic liquid crystal material has fluid-like properties that facilitate the conformance or the distortion thereof to the shape of the capsule wall in the absence of an electric field. On the other hand, in the presence of an electric field such nematic material will relatively easily change to ordered alignment with respect to such field.

Liquid crystal material of a type other than nematic or combinations of various types of liquid crystal material and/or other additives may be used with or substituted for the preferred nematic liquid crystal material as long as the encapsulated liquid crystal is operationally nematic. However, cholesteric and smectic liquid crystal material generally are bulk driven. It is more difficult to break up the bulk structure thereof for conformance to capsule wall shape and energy considerations in the capsule.

Turning to FIGS. 2 and 3, a schematic representation of the single capsule 32 containing liquid crystal 30 is shown, respectively, in the field-off and field-on conditions. The capsules 32 are spherical and have a generally smooth curved interior wall surface 50 defining the boundary for the volume 31. The actual dimensional parameters of the wall surface 50 and of the overall capsule 32 are related to the quantity of liquid crystal 30 contained therein and possibly to other characteristics of the individual liquid crystal material therein. Additionally, the capsule 32 applies a force to the liquid crystals 30 tending to pressurize or at least to maintain substantially constant the pressure within the volume 31. As a result of the foregoing, and due to the surface wetting nature of the liquid crystal, the liquid crystals which ordinarily in free form would tend to be parallel, although perhaps randomly distributed, are distorted to curve in a direction that generally is parallel to a relatively proximate portion of the interior wall surface 50. Due to such distortion the liquid crystals store elastic energy. For simplicity of illustration, a layer 51 of liquid crystal molecules whose directional orientation is represented by respective dashed lines 52 is shown in closest proximity to the interior wall surface 50. The directional orientation of the liquid crystal molecules 52, more accurately the liquid crystal structure, is distorted to curve in the direction that is parallel to a proximate area of the wall surface 50. The directional pattern of the liquid crystal molecules away from the boundary layer 52 within the capsule is represented by 53. The liquid crystal molecules are directionally represented in layers, but it will be appreciated that the molecules themselves are not confined to such layers. Thus, the organization in an individual capsule is predetermined by the organization of the structure 52 at the wall and is fixed unless acted on by outside forces, e.g. an electric field. On removal of the electric field in the directional orientation would revert back to the original one, such as that shown in FIG. 2.

Nematic type material usually assumes a parallel configuration and usually is optical polarization direction sensitive. However, since the material 52 in the encapsulated liquid crystal 11 is distorted or forced to curved form in the full three dimensions of the capsule 32, such nematic liquid crystal material in such capsule takes on an improved characteristic of being insensitive to the direction of optical polarization of incident light. The inventor has discovered, moreover, that when the liquid crystal material 30 in the capsule 32 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules 52.

The liquid crystal 30 in the capsule 32 has a discontinuity 55 in the generally spherical orientation thereof due to the inability of the liquid crystal to align uniformly in a manner compatible with parallel alignment with the wall 50 and a requirement for minimum elastic energy. Such discontinuity is in three dimensions and is useful to effect a distorting of the liquid crystal 30 further to decrease the possibility that the liquid crystal 30 would be sensitive to optical polarization direction of incident light. The discontinuity protrusion 55 would tend to cause scattering and absorption within the capsule, and the tangential or parallel alignment of the liquid crystal molecules with respect to portions of the interior wall surface 50 of the capsules both cause scattering and absorption within the capsule 32. When the electric field is applied, for example, as is shown in FIG. 3, the discontinuity will no longer exist so that such discontinuity will have a minimum effect on optical transmission when the encapsulated liquid crystal 11 is in a field-on or aligned condition.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering and polarization insensitivity in the field-off condition, which is a feature of this invention.

In the field-on condition, or any other condition which results in the liquid crystal being in ordered or parallel alignment, as is shown in FIG. 3, the encapsulated liquid crystal 11 will transmit substantially all the light incident thereon and will tend not to be visible in the support medium 12. On the other hand, in the field-off condition when the liquid crystal is in distorted alignment, sometimes referred to herein as random alignment, for example as is shown in FIG. 2, some of the incident light will be absorbed, but also some of the incident light will tend to be scattered isotropically in the support medium 12. Using total internal reflection such isotropically scattered light can be redirected to the encapsulated liquid crystal 11 thus brightening the same tending to cause it to appear white to a viewer or viewing instrument.

The index of refraction of the encapsulating medium 32 and the ordinary index of refraction of the liquid crystal 30 should be matched as much as possible when in the field-on or liquid crystal orderly aligned condition to avoid optical distortion due to refraction of incident light passing therethrough. However, when the liquid crystal material is in distorted or random alignment, i.e. there is no field applied, there will be a difference in the indices of refraction at the boundary of the liquid crystal 30 and wall of capsule 32; the extraordinary index of refraction of the liquid crystal is greater than the index of refraction of the encapsulating medium. This causes refraction at that interface or boundary of the liquid crystal material and of the containment or encapsulating medium and, thus, further scattering. Light that is so further scattered will be internally reflected for further brightening in the liquid crystal appearance. Such occurrence of different indices of refraction is known or birefringence. Principles of birefringence are described in *Optics* by Sears and in *Crystals And The Polarizing Microscope* by Hartshorne and Stewart, the relevant disclosures of which are hereby incorporated by reference. Preferably the encapsulating or containment medium 32 and the support medium 12 have the same index of refraction to appear optically substantially as the same material, thus avoiding a further optical interface.

As long as the ordinary index of refraction of the liquid crystal material is closer to the index of refraction of the so-called encapsulating medium, than is the extraordinary index of refraction, a change in scattering will result when going from field-on to field-off conditions, and vice-versa. Maximum contrast results when the ordinary index of refraction matches the index of refraction of the medium. The closeness of the index matching will be dependent on the desired degree of contrast and transparency in the device, but the ordinary index of refraction of the crystal and the index of the medium will preferably differ by no more than 0.03, more preferably 0.01, especially 0.001. The tolerated difference will depend upon capsule size.

According to the preferred embodiment and best mode, desirably the electric field E shown on FIG. 3 is applied to the liquid crystal 30 in the capsule 32 for the most part rather than being dissipated or dropped substantially in the encapsulating material. There should not be a substantial voltage drop across or through the material of which the wall 54 of the capsule 32 is formed; rather, the voltage drop should occur across the liquid crystal 30 within the volume 31 of the capsule 32.

The electrical impedance of the encapsulating medium preferably should in effect be large enough relative to that of the liquid crystal in the encapsulated liquid crystal 11 that a short circuit will not occur exclusively through the wall 54, say from point A via only the wall to point B, bypassing the liquid crystal. Therefore, for example, the effective impedance to induced or displacement current flow through or via only the wall 54 from point A to point B should be greater than the impedance that would be encountered in a path from point A to point A' inside the interior wall surface 50, through the liquid crystal material 30 to point B' still within the volume 31, ultimately to point B again. This condition will assure that there will be a potential difference between point A and point B. Such potential difference should be large enough to produce an electric field across the liquid crystal material that will tend to align the same. It will be appreciated that due to geometrical considerations, namely the length through only the wall from point A to point B, for example, such condition still can be met even though the actual impedance of the wall material is lower than that of the liquid crystal material therein.

The dielectric constants (coefficients) of the material of which the encapsulating medium is formed and of which the liquid crystal is comprised, and the effective capacitance values of the capsule wall 54, particularly in a radial direction and of the liquid crystal across which the electric field E is imposed, all should be so related that the wall 54 of the capsule 32 does not substantially drop the magnitude of the applied electric field E. Ideally the capacitance dielectric constants (coefficients) of the entire layer 61 (FIG. 4) of encapsulated liquid crystal material should be substantially the same for the field-on condition.

The liquid crystal 30 will have a dielectric constant value that is anisotropic and, therefore, sometimes is referred to as a dielectric coefficient. It is preferable that the dielectric constant of the wall 54 be no lower than the dielectric coefficient of the anisotropic liquid crystal material 30 to help meet the above conditions for optimum operation. It is desirable to have a relatively high positive dielectric anisotropy in order to reduce the voltage requirements for the electric field E. The differential between the dielectric coefficient for the liquid crystal 30 when no electric field is applied, which should be rather small, and the dielectric coefficient for the liquid crystal when it is aligned upon application of an electric field, which should be relatively large, should be as large as possible. The dielectric constants (coefficients) relationships are discussed in the above applications. It should be noted, in particular, though, that the critical relationship of dielectric values and applied electric field should be such that the field applied across the liquid crystal material in the capsule(s) is adequate to cause alignment of the liquid crystal structure with respect to the field. The lower dielectric values of commonly used liquid crystals are, for example, from as low as about 3.5 to as high as about 8.

The capsules 32 may be of various sizes. The smaller the size, though, the higher the requirements will be for the electric field to effect alignment of the liquid crystal in the capsule. Preferably, though, the capsules should be of uniform size parameters so that the various characteristics, such as the optical and electrical characteristics, of an apparatus, such as a display, using the encapsulated liquid crystal will be substantially uniform. Moreover, the capsules 32 should be at least 1 micron in diameter so they appear as discrete capsules relative to an incident light beam; a smaller diameter would result in the light beam "seeing" the capsules as a continuous homogeneous layer and would not undergo the required isotropic scattering. Examples of capsule sizes, say from 1-30 microns diameter, and of liquid crystal material are in the above concurrently filed application and are hereby specifically incorporated by reference.

A preferred liquid crystal material in accordance with the best mode of the invention is that nematic material NM-8250, an ester that has been sold by American Liquid Xtal Chemical Corp., Kent, Ohio, U.S.A. Other examples may be ester combinations, biphenyl and/or biphenyl combinations, and the like.

Several other types of liquid crystal material useful according to the invention include the following four examples, each being a recipe for the respective liquid crystal materials. The so-called 10% material has about 10% 4-cyano substituted materials; the 20% material has about 20% 4-cyano substituted materials, and so on.

| 10% Material | | |
|---|---|---|
| Pentylphenylmethoxy Benzoate | 54 | grams |
| Pentylphenylpentyloxy Benzoate | 36 | grams |
| Cyanophenylpentyl Benzoate | 2.6 | grams |
| Cyanophenylheptyl Benzoate | 3.9 | grams |
| Cyanophenylpentyloxy Benzoate | 1.2 | grams |
| Cyanophenylheptyloxy Benzoate | 1.1 | grams |
| Cyanophenyloctyloxy Benzoate | 9.94 | grams |
| Cyanophenylmethoxy Benzoate | 0.35 | grams |
| 20% Material | | |
| Pentylphenylmethoxy Benzoate | 48 | grams |
| Pentylphenylpentyloxy Benzoate | 32 | grams |
| Cyanophenylpentyl Benzoate | 5.17 | grams |
| Cyanophenylheptyl Benzoate | 7.75 | grams |
| Cyanophenylpentyloxy Benzoate | 2.35 | grams |
| Cyanophenylheptyloxy Benzoate | 2.12 | grams |
| Cyanophenyloctyloxy Benzoate | 1.88 | grams |
| Cyanophenylmethoxy Benzoate | 0.705 | grams |
| 40% Material | | |
| Pentylphenylmethoxy Benzoate | 36 | grams |
| Pentylphenylpentyloxy Benzoate | 24 | grams |
| Cyanophenylpentyl Benzoate | 10.35 | grams |
| Cyanophenylheptyl Benzoate | 15.52 | grams |
| Cyanophenylpentyloxy Benzoate | 4.7 | grams |
| Cyanophenylheptyloxy Benzoate | 4.23 | grams |
| Cyanophenyloctyloxy Benzoate | 3.76 | grams |
| Cyanophenylmethoxy Benzoate | 1.41 | grams |
| 40% MOD | | |
| Pentylphenylmethoxy Benzoate | 36 | grams |
| Pentylphenylpentyloxy Benzoate | 24 | grams |
| Cyanophenylpentyl Benzoate | 16 | grams |
| Cyanophenylheptyl Benzoate | 24 | grams |

The encapsulating medium forming respective capsules 32 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized, molecular weight of at least about 1,000, resin. Use of a PVA of Monsanto Company identified as Gelvatol 20/30 represents the best mode of the invention.

A method for making emulsified or encapsulated liquid crystals 11 may include mixing together the containment or encapsulating medium, the liquid crystal material, and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 32 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing.

The capsule size (diameter) preferably should be uniform in the emulsion for uniformity of operation with respect to effect on incident light and response to electric field. Exemplary capsule size range may be from about 0.3 to about 100 microns, preferably 0.5 to 30 microns, and more preferably 1 to 5 microns.

Various techniques may be employed to form the support medium 12, which may be of the same or similar material as the encapsulating or containment medium. For example, the lower support medium 12b may be formed using a molding or casting process. The electrode 13 and liquid crystal material may be applied for support by that medium 12b. The electrode 14 may be applied, e.g. by printing. Thereafter, the upper support medium portion 12a may be poured or cast in place to complete enclosing the encapsulated liquid crystal material and the electrodes. Alternatively, the support medium portions 12a, 12b may be a substantially transparent plastic-like film or a plate of glass, as is described in Example 1, for example.

The reflectance medium 18, if a solid, for example, may be applied to the support medium portion 12b by a further casting or molding technique.

The following are several examples of materials and methods for making liquid crystal display devices and operational characteristics thereof in accordance with the present invention.

EXAMPLE 1

An example of the isotropically scattering material was produced by mixing about 2 grams of 8250 (an ester by American Liquid Xtal) nematic liquid crystal with about 4 grams of a 20% solution of Airco 405 polyvinyl alcohol (the other 80% of such solution was water). The material was mixed in a small homogenizer at low shear to form an emulsion. Using a doctor blade at about a 5 mil setting the emulsion was coated on an electrode of Intrex material already in position on a polyester film base of about 5 mils thickness. Such film was that known as Mylar. Another sheet of such film with such an electrode was placed on the encapsulated liquid crystal layer, thus sandwiching the latter between the respective electrodes and films. The individual encapsulated operationally nematic liquid crystal capsules or particles were about 4 to 5 microns in diameter and the total layer of encapsulated liquid crystal material was about 20 to 30 microns thick.

The device made according to Example 1 was tested. The resulting material scattered light in a zero electric field (hereinafter usually referred to as a zero field or field off condition) condition. In an applied field of 10 volts the scattering decreased and at 40 volts scattering stopped altogether.

Although a homogenizer was used, other types of mixers, blenders, etc., may be used to perform the desired mixing.

EXAMPLE 2

An example of the isotropically scattering material was produced by mixing about 2 grams of 8250 nematic liquid crystal with about 4 grams of a 22% solution (78% water) of Gelvatol 20/30 (by Monsanto) polyvinyl alcohol. The material was mixed in a small homogenizer at low shear to form an emulsion. The emulsion was coated on Intrex film electrode and Mylar film polyester base, as in Example 1, with a doctor blade at a 5 mil setting and the sandwich was completed as in Example 1. The nematic capsules or particles were about 3 to 4 microns in diameter, and the encapsulated liquid crystal layer was about 25 microns thick.

The device made according to Example 2 was tested. The resulting material scattered light in a zero or field-off electric field condition. In an applied field of 10 volts the scattering decreased and at 40 volts scattering stopped altogether.

EXAMPLE 3

An example of the isotropically scattering material was produced by mixing about 2 grams of E-63 (a biphenyl by British DrugHouse, a subsidiary of E. Merck of West Germany) nematic liquid crystal with about 4 grams of a 22% solution of Gelvatol 20/30 (by Monsanto) polyvinyl alcohol. The material was mixed in a small homogenizer at low shear to form an emulsion. The emulsion was coated on Intrex film electrode and Mylar film polyester base with a doctor blade at a 5 mil setting and the sandwich was completed as above. The thickness of the encapsulated liquid crystal layer was about 25 microns; the nematic capsules or particles were about 4 to 5 microns in diameter.

The device made according to Example 3 was tested. The resulting material scattered light in a zero field or field-off condition. In an applied field of 7 volts the scattering decreased and at 35 volts scattering stopped altogether.

EXAMPLE 4

An example of the isotropically scattering material was produced by mixing about 2 grams of 8250 liquid crystal with about 4 grams of a 22% solution of Gelvatol 20/30 polyvinyl alcohol. The material was mixed in a small homogenizer at low shear to form an emulsion. The emulsion was coated on Intrex film electrode and Mylar polyester film base with a doctor blade at a 5 mil setting and the sandwich was completed as above. The thickness of the encapsulated liquid crystal layer was about 25 microns; the nematic capsules or particles were about 4 to 5 microns in diameter.

To improve the emulsion stability and coating uniformity 0.001% of GAF LO 630 non-ionic surfactant (detergent) was added before the mixing step. Improved performance instability of the emulsion and in coating of the emulsion onto the electrode/polyester film base were noted. The operational results were otherwise substantially similar to those described above with respect to Example 1.

Thus, it will be appreciated that in accordance with the invention a surfactant, preferably a non-ionic surfactant, a detergent, or the like may be mixed with the encapsulated liquid crystal material prior to depositing on the electrode coated film, as was just described above.

EXAMPLE 5

The steps of Example 1 were followed using the same materials as in Example 1 except that ⅛ inch glass plate was substituted for the Mylar film. Operation was substantially the same as was described with respect to Example 1.

EXAMPLE 6

A mixture was formed of 8250 nematic liquid crystal and a solution of 15% AN169 Gantrez in 85% water. Such Gantrez is poly(methyl vinyl ether/maleic anhydride), a polymaleic acid product, of GAF Corporation. The mixture was of 15% liquid crystal and 85% Gantrez as the containment medium. The mixture was homogenized at low shear to form an emulsion, which was applied to an electrode/support film as above; such support film was about 1.2 mils thick. After drying of the emulsion, the resulting liquid crystal emulsion responded to an electric field generally as above, scattering when in field-off condition, showing a threshold of about 7 volts to begin reducing scattering, and having a saturation level of substantially no scattering at about 45 volts.

Another example of an acid type containment medium useful in the invention is carbopole (carboxy polymethylene polymer by B. F. Goodrich Chemical Company), or polyacid.

In accordance with the invention, other types of support media 12 that may be used include polyester materials; and polycarbonate material, such as Kodel film. Tedlar film, which is very inert, also may be used if adequate adhesion of the electrode can be accomplished. Such media 12 preferably should be substantially optically transparent.

In accordance with the invention, several different polymer containment media that may be used are listed in Chart I below. The chart also indicates several characteristics of the respective polymers.

CHART I

| Containment Medium | Viscosity | % Hydrolyzed | Molecular Weight | Temperature & % Solutions |
|---|---|---|---|---|
| 20/30 Gelvatol, by Monsanto Company | 4–6 CPS | 88.7–85.5 | 10,000 | 4% at 20° C. |
| 40/20 Gelvatol, by Monsanto Company | 2.4–3 CPS | 77–72.9 | 3,000 | 4% at 20° C. |
| 523, by Air Products And Chemicals, Inc. | 21–25 | 87–89 | — | 4% at 20° C. |
| 72/60 Elvanol, by DuPont Co. | 55–60 | 99–100 | — | 4% at 20° C. |
| 405 Poval, by Kurashiki | 2–4 CPS | 80–82 | — | 4% at 20° C. |

Other Gelvatol PVA materials that may be used include those designated by Monsanto as 20-90; 9000; 20-60; 6000; 3000; and 40-10. Other examples of containment media include gelatin and latex materials.

A preferred quantity ratio of liquid crystal material to containment medium is about one part by weight liquid crystal material to about three parts by weight of containment medium. Acceptable encapsulated liquid crystal emulsion operative according to the invention also may be achieved using a quantity ratio of about one part liquid crystal material to about two parts containment medium, e.g., Gelvatol PVA. Moreover, although a 1:1 ratio also will work, generally it will not function quite as well as material in the ratio range of from about 1:2 to about 1:3.

Turning now to FIGS. 4 and 5, a portion 60 of a liquid crystal display device in accordance with the present invention is illustrated. The portion or device 60 is a completion of the liquid crystal apparatus 10 described above with reference to FIG. 1 in that plural encapsulated liquid crystals 11, indeed plural layers thereof, are contained in a support medium 12. The sizes, thicknesses, diameters, etc., of the several parts shown in FIGS. 4 and 5 are not necessarily to scale; rather the sizes are such as is necessary to illustrate the several parts and their operation, as is described below, in accordance with the invention.

The electrodes 13, 14 are employed to apply a desired electric field to effect selective alignment of the liquid crystal material in the manner shown in FIG. 3, for example. Means other than electrodes may be employed to apply some type of input to the display device 60 for the purpose of effecting ordered or random alignment of the liquid crystal.

The encapsulated liquid crystals 11 are arranged in several layers 61 within the display portion 60. The layers 61 may be divided into several portions representing the various characters or portions of characters intended to be displayed by the display 60. For example, the longer lefthand portion 61L of the layers 61 shown in FIG. 4 may represent a section view through one part of a well known 7-segment display pattern, and the relatively short righthand portion 61R of the layers 61 shown in FIG. 4 may represent a part of another 7-segment character display. It will be appreciated, though, that various patterns of liquid crystal material may be employed in accordance with the present invention. A zone 62 of support medium 12 fills the area between the liquid crystal layer portions 61L, 61R. Subsequent reference to layers 61 will be in the collective, i.e. referring to layer 61 as including the several layers or layers comprising the same. As an example, the composite thickness of such layer 61 may be from about 0.3 mils to about 10 mils; uniform thickness is preferred for uniform response to electric field, scattering, etc.

It is significant to note that such an arrangement or pattern of encapsulated liquid crystal material layer portions, such as at 61L and 61R, separated at zone 62 by support medium 12 or other material is facilitated, or even made possible due to the encapsulating or confining of the liquid crystal in discrete containment media, such as is formed by the preferred stable emulsion. Therefore, especially on a relatively large size device such as a display, e.g. used in lieu of a transparency in a projector, such as an overhead projector, a 16 mm or a 35 mm projector, etc., encapsulated liquid crystal material may be applied to the support medium 12 only where it is required to provide the selectable optical characteristics. Such patterning of the encapsulated liquid crystal material can in some instances, then, appreciably reduce the amount of such material required for a particular application. Such patterning is further made possible consistent with desired operation of a device using encapsulated liquid crystal material in accordance with the invention due to the functional operation thereof as will be described in detail below.

The display 60 may be used, for example, in an air environment, such air being represented by the reference numeral 63, and the air forms an interface 64 at the viewing side or from the viewing direction 20 with the support medium 12. The index of refraction N of the external medium 63 is different from the index of refraction N' of the encapsulating medium 12, the latter usually being larger than the former. As a result, a beam of light 65, which arrives generally from the viewing direction 20, passing through the interface 64 into the support medium 12 will be bent toward the normal, which is an imaginary line 66 perpendicular to that interface 64. That light beam 65a inside the support medium 12 will be closer to normal than the incident beam 65 satisfying the equation relationship N Sine $\theta$ = N' Sine $\theta'$, wherein $\theta$ is the angle of the incident light beam 65 with respect to the normal and $\theta'$ is the angle of the light beam 65a with respect to normal. Such mathematical relationship will apply at the interface 19, as follows: N' Sine $\theta'$ = N'' Sine $\theta''$. For total internal reflection in the display 60, the index of refraction N'' of the reflectance medium 18 is smaller than the index of refraction N' of the support medium 12. Accordingly, if the light beam 65a, for example, were able to and did pass through the interface 19, it would be bent away from the normal at the interface 19 to the angle $\theta''$ with respect to normal. Actually, since the light beam 65, 65a is not scattered off course by the liquid crystal material in layers 61, i.e., because it passes through the zone 62, it will indeed likely exit through the interface 19.

Continuing to refer particularly to FIG. 4, operation of a liquid crystal display 60 in accordance with the invention is now described. The operationally nematic liquid crystal 30 is in distorted or random alignment due to existence of a field-off condition. Incident light beam 70 enters the support medium 12 at the interface 64 and is bent as the light beam 70a that impinges as incident light on the layer 61 of encapsulated liquid crystal. The random or distorted encapsulated liquid crystal material will isotropically scatter the light incident thereon. Therefore, there are several possibilities of how such incident light beam 70a would tend to be scattered, as follows:

A. For example, one possibility is that the incident light beam 70a will be directed according to the dotted line 70b toward the interface 19. The angle at which the light beam 70b impinges on the interface 19 is within the illustrated solid angle $\alpha$ (defined in the planar direction of the drawing of FIG. 4 by the dashed lines 71) of a so-called cone of illumination. Light falling within such solid angle $\alpha$ or cone of illumination is at too small an angle with respect to normal at the interface 19 to be totally internally reflected at that interface; therefore, the light beam 70b will pass through interface 19 while bending away from the normal to form the light beam 70c. Light beam 70c passes into the reflectance medium 18 and directly out through the latter.

B. Another possibility is that the light beam 70a will be isotropically scattered in the direction of the light beam 70d outside the cone angle $\alpha$. Total internal reflection will occur at the interface 19 causing the light beam 70d to be reflected as light beam 70e back to the layer 61 of encapsulated liquid crystal material where it will be treated as another independently incident light beam thereto, just like the light beam 70a from which it was derived. Therefore, such light beam 70e will undergo isotropic scattering again as is described herein.

C. Still another possibility is that the incident light beam 70a, or that derived therefrom, such as the light beam 70e, will be isotropically scattered toward the interface 64 at an angle that is so close to normal at that interface 64 that the light beam will pass through the interface 64 into the "medium" 63, such as the air. The solid angle $a'$ of a cone of illumination, like the cone angle $a$ mentioned above, within which such scattered light beam 70e must fall to be emitted out through the interface 64 is represented by the single dot phantom lines 72. Light beam 70f represents such a light beam that is so emitted from the display 60. It is that light, e.g. the sum of such emitted light beams 70f, which exits at the interface 64 that causes the layer 61 of encapsulated liquid crystals 11 to give the appearance of a white or bright character as viewed from the viewing direction 20.

D. Still a further possibility is that the light beam 70a may be isotropically scattered in the direction of the light beam 70g. Light beam 70g is outside the solid cone angle $a'$ and, therefore, will undergo total internal reflection at the interface 64, whereupon the reflected beam 70h will impinge back on the layer 61 as an effectively independent incident light beam, like the beam 70e mentioned above and having a similar effect.

The index of refraction of the electrodes 13,14 usually will be higher than that (those) of the containment medium and support medium and the containment and support media indices of refraction preferably are at least about the same. Therefore, the light passing from the containment medium into the electrode material will bend toward the normal, and that passing from the electrode into the support medium will bend away from the normal; the net effect of the electrode thus being nil or substantially negligible. Accordingly, the majority of total internal reflection will occur at the interfaces 19,64.

As viewed from the viewing direction 20, the zone 62 will appear dark or colored according to the composition of the absorbent layer 21. This is due to the fact that the light beam 65, 65a, 65b, representing the majority of light that passes through zone 62, will tend to pass through interface 64, support medium 12, the interface 19 and the reflectance medium 18, being bent toward or away from the normal, at respective interfaces as shown.

The projector of the invention preferably uses light that is transmitted through the liquid crystal material without refraction or that is forward scattered by the liquid crystal material. Briefly referring to FIG. 5, the field-on or ordered alignment condition and operation of the encapsulated liquid crystal layer 61 in the display device 60 are shown for achieving such unrefracted or substantially unrefracted transmission of light. The encapsulated liquid crystals 11 in the layer 61 of FIG. 5 are like those seen in FIG. 3. Therefore, like the light beam 65, 65a, 65b which passes through the zone 62, the light beam 70, 70a, 70i will follow a similar path being transmitted through the aligned and, thus, effectively transparent or non-scattering layer 61. At the interface 19, the light beam 70a will be bent away from the normal and subsequently light beam 70i will be transmitted through medium 18 in parallel to the beam 70' entering the display 60. Thus, when the display 60, and particularly the encapsulated liquid crystal material therein, is in the orderly aligned or field-on condition, the area at which the liquid crystal is located will have substantially the same appearance as that of the zone 62.

It is noted that if either the incident beam 65 or 70 were to enter the support medium 12 at the interface 64 at such a large angle with respect to the normal there, and, therefore, ultimately to impinge on the interface 19 at an angle greater than one falling within the so-called cone of light angle $a$, such beam would be totally internally reflected at the interface 19. However, such reflected light probably would remain within the support medium 12 due to subsequent transmission through the layer of liquid crystal material 61 and subsequent total internal reflectance at the interface 64, etc.

Turning now to FIG. 6, an example of a liquid crystal device 100 in accordance with the invention is shown in the form of a liquid crystal display device, which appears as a square cornered figure eight 101 within the substrate or support medium 12, which in this case preferably is a plastic material, such as Mylar, or may alternatively be another material, such as glass, for example. The shaded area appearing in FIG. 6 to form the square cornered figure eight is comprised of one or more layers 61 of encapsulated liquid crystals 11 arranged in one or more layers on and adhered to the substrate 12. An enlarged fragmentary section view of a portion of the figure eight 101 is illustrated in FIG. 4 as the display 60 described above with reference to FIGS. 4-5.

Each of the seven segments of the figure eight 101 may be selectively energized or not so as to create various numeral characters. For example, energization of the segments 101a and 101b would display the numeral "1" and energization of the segments 101a, 101b, 101c would display the numeral "7". What is meant by energization here is the placing of the respective segments in a condition to appear bright relative to background. Therefore, energization means field-off or random alignment condition of, for example, segments 101a and 101b to display "1" while other segments are in field-on, ordered alignment.

FIGS. 7 and 8 illustrate, respectively in fragmentary section and fragmentary isometric-type views, an embodiment of the invention representing the preferred arrangement of the liquid crystal layer 61" and electrodes 13", 14" in the support medium 12". In FIGS. 7 and 8, double primed reference numerals designate parts corresponding to those designated by unprimed reference numerals in FIGS. 4 and 5. In particular, it is preferred according to the illustration of FIGS. 7 and 8 that the display device 60" have the layer 61" and the electrode 13" substantially continuous over the entire or at least a relatively large portion of a display device. The electrode 13" may be connected, for example, to a source of electrical ground potential. The electrode 14" may be divided into a plurality of electrically isolated electrode portions, such as those represented at 14a, 14b, each of which may be selectively coupled to a source of electric potential to complete application of an electric field across that liquid crystal material which is between such energized electrode portion 14a or 14b and the other electrode 13". Therefore, for example, an electric field may be applied across the electrodes 14a, 13" causing the encapsulated liquid crystal material falling substantially directly therebetween to be in ordered, field-on alignment and, thus, effectively optically transparent in the manner described above. At the same time, it may be that the electrode 14b is not connected to a source of electric potential so that the liquid crystal material between such electrode 14b and the electrode 13" will be in distorted or random alignment and, therefore, will appear relatively bright from the viewing direction 20". A small gap 120 between electrodes 14a, 14b provides electric isolation therebetween to permit the just-described separate energization or not thereof.

Briefly referring to FIG. 9, the preferred embodiment and best mode of the present invention is shown as the display 60'''. In FIG. 9 the various portions designated by triple primed reference numerals correspond to those portions designated by similar reference numerals, as are described above. The display device 60''' is made generally in accordance with the numbered examples presented above. In particular, the lower support medium 12b''' is formed of Mylar film having an indium doped tin oxide Intrex electrode 13''' thereon; and the layer 61''' of encapsulated liquid crystal material was applied to the electrode coated surface, as is shown. Several electrode portions 14a''', 14b''', etc. with a respective gap 120''' therebetween, were applied either directly to the surface of the layer 61''' opposite the support medium 12b''' or to the support medium 12a''', and the latter was applied in the manner shown in FIG. 9 to complete a sandwich of the display device 60'''. The reflectance medium 80''' was air. Operation of the display device 60''' is according to the operation described above, for example, with reference to FIGS. 4–5 and 7.

Referring to FIG. 10, an encapsulated liquid crystal 130 of the type described in Example 7 below is schematically shown. Such capsule 130 includes a spherical capsule wall 131 of containment material 132, operationally nematic liquid crystal material 133 inside the capsule, and a cholesteric chiral additive 134. The additive 134 is generally in solution with the nematic material 13, although the additive is shown in FIG. 10 at a central location because its function primarily is with respect to the liquid crystal material remote from the capsule wall, as is described further below. The capsule 130 is shown in field-off, distorted condition with the liquid crystal material distorted in the manner described above, for example, with reference to FIG. 2. The liquid crystal material most proximate the wall 131 tends to be forced to a shape curved like the inner boundary of that wall, and there is a discontinuity 135 analogous to the discontinuity 55 shown in FIG. 2.

EXAMPLE 7

The steps of Example 1 were followed using the same materials and steps as in Example 1 except that 3% cholesterol oleate (chiral additive), a cholesteric material, was added prior to the mixing step, and then such mixing was carried out at very low shear. The resulting capsules were somewhat larger than those produced in Example 1. The encapsulated liquid crystal material was still operationally nematic.

In operation of the material formed in Example 7, it was found that the chiral additive improved (reduced) the response time of the operationally nematic encapsulated liquid crystal material, particularly in returning to the distorted alignment generally following the wall shape of the individual capsules, promptly after going from a field on to a field off condition. In such relatively large capsules, say about on the order of at least 8 microns total diameter, when going to the field off condition, it is the usual case that the liquid crystal material adjacent the capsule wall would return to the distorted alignment following the capsule wall shape or curvature faster than would the liquid crystal material closer to the center of the capsule; this disparity tends to slow the overall response time of the material. However, the chiral additive induces a tendency for the structure to twist. This influence on the nematic material is most noticeable remote from the capsule wall and, thus, speeds up the return of such relatively remote material to distorted alignment, preferably influenced by the shape of the capsule wall. Such chiral additive may be in the range of about 0.1% to about 8% of the liquid crystal material and a preferred range of about 2% to about 5%. The amount may vary depending on the additive and the liquid crystal and could even be outside the stated range as long as the capsule remains operationally nematic.

It will be appreciated that the encapsulated liquid crystal 130 of FIG. 10 may be substituted in various embodiments of the invention described in this application in place of or in conjunction with the otherwise herein described encapsulated liquid crystal material. Operation would be generally along the lines described in Example 7.

Another additive also may be used to reduce and/or otherwise to control the viscosity of the liquid crystal during manufacturing of a device 60, for example. The reduced viscosity may have a positive effect on emulsion formation and/or on the process of applying the emulsion to an electrode covered support medium 12. An example of such an additive may be chloroform, which is water-soluble and leaves the emulsion on drying.

EXAMPLE 8

An emulsion was prepared using about 15 grams of 22% (the rest was water) low viscosity, medium hydrolysis PVA; about 5 grams of 8250 liquid crystal (of American Liquid Xtal) containing about 3% (percentages are with respect to the weight of the liquid crystal) cholesterol oleate, about 0.1% of a 1% (the rest was water) solution of L.O. 630 surfactant, and 15% chloroform.

Such material was mixed at high shear for about 3 minutes. The capsules produced were about 1 to 2 microns in diameter. A layer of such encapsulated liquid crystal was applied to an electrode covered support medium using a doctor blade at a gap 5 setting. The material was dried and operated generally as the materials described above.

Briefly referring to FIG. 11, there is shown an alternate embodiment of encapsulated liquid crystal material 200, which may be substituted for the various other embodiments of the invention disclosed herein. The encapsulated liquid crystal material 200 includes operationally nematic liquid crystal material 201 in a capsule 202 having preferably a generally spherical wall 203. In FIG. 11 the material 200 is in field-off condition, and in that condition the structure 204 of the liquid crystal molecules is oriented to be normal or substantially normal to the wall 203 at the interface 205 therewith. Thus, at the interface 205 the structure 204 is generally oriented in a radial direction with respect to the geometry of the capsule 202. Moving closer toward the center of the capsule 202, the orientation of the structure 204 of at least some of the liquid crystal molecules will tend to curve in order to utilize, i.e. to fill, the volume of the capsule 202 with a substantially minimum free energy arrangement of the liquid crystal in the capsule, for example, as is seen in the drawing.

Such alignment is believed to occur due to the addition of an additive to the liquid crystal material 201 which reacts with the support medium to form normally oriented steryl or alkyl groups at the inner capsule wall. More particularly, such additive may be a chrome steryl complex or Werner complex that reacts with PVA of the support medium (12) that forms the capsule wall 203 to form a relatively rigid crust or wall with a steryl group or moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

An example of such material 200 is presented below:

EXAMPLE 9

To a 5 gm sample of 8250 nematic liquid crystal was added 0.005 gm of a 10% solution of Quilon M, a chrome steryl complex manufactured by DuPont, along with 3 gm of chloroform. The resulting material was homogenized at low shear with 15 gms of a 22% w/w solution of Gelvatol 20/30 PVA (the remaining 78% of such Gelvatol solution was water).

The result was an encapsulated liquid crystal in which the capsule wall reacted with the Quilon M to form an insoluble shell.

By observation with polarized light it was determined that the capsule wall aligned the liquid crystal in a radial direction.

A film was cast on a Mylar support medium already having an Intrex electrode thereon, as above, using a doctor blade with a gap setting of 5 mils. The resulting film had a thickness of 1 mil on drying. An auxiliary electrode was attached. The material began to align in the capsule at 10 volts and was fully aligned at 40 volts. Such alignment would be like that shown in FIG. 3 above.

The invention may be used in a variety of ways to effect display of data, characters, information, pictures, etc. on both small and large scale. According to the preferred embodiment and best mode of the invention, the liquid crystal material is placed in the support medium 12 at only those areas where characters, etc., are to be formed. In the alternative, the layer 61 may extend across the entire support medium 12, and only those areas where characters are to be displayed will have electrodes for controlling field-on/field-off with respect to the proximate portions of the liquid crystal layer 61. Various other designs also may be employed, as may be desired, utilizing the enhanced scattering effected by the total internal reflection and/or optical interference principles in accordance with the present invention.

THE PROJECTOR APPARATUS

Turning, now, to FIG. 12, a liquid crystal projector according to the invention is designated 300. The projector 300 includes a housing 301, an optics portion 302, including light input and light output portions 303, 304, and a liquid crystal display 305, all preferably located within, coupled to, or supported with respect to the housing 301, and an electric drive 306, which may be within, on, or external of the housing 301. The purpose of the projector 300 is to project an image or characteristics of an image formed by the liquid crystal display 305, while the same is driven by the electric drive 306, onto a projection screen or the like 307.

The liquid crystal display 305 is intended selectively to affect (e.g. scatter) and not to affect (e.g. transmit) light incident thereon and preferably is of one of the liquid crystal devices described above. For example, the liquid crystal display 305 would include a support medium and/or containment medium 310 having one or more layers of plural volumes of liquid crystal material 311 therein. The support/containment medium 310 preferably is formed as a sheet of material having a dimension extending into the plane of the drawing of FIG. 12 with an edge 312 of such sheet being seen in FIG. 12. The opposite surfaces 313, 314 of the display sheet preferably are optically transparent as opposed to being absorbent or reflective. Therefore, when an electric field is applied to a selected portion or area of liquid crystal contained in the display 305, whereby such liquid crystal material becomes effectively transparent, light incident on the display 305 will be transmitted therethrough without substantial scattering or absorption. However, light incident on those portions of the display 305 in which the volumes of liquid crystal material 311 are in the scattering mode described above, or in any event in the field-off, curvilinearly aligned or distorted structural orientation, will tend to be isotropically scattered, for example over 2 pi radians, as viewed in the planar drawing, or 4 pi steradians in three dimensions (spherical volumes), by such liquid crystal material in the manner described in greater detail above.

Dye, such as non-pleochroic dye, may be included in display 305 to color light to produce a colored output. Pleochroic dye may be included in the liquid crystal.

In optics 302 of projector 300, light input portion 303 includes light source 319, e.g. a conventional electric lamp or projector lamp, and collecting or collimating lens 320, and light output portion 304 includes projection lens 321 and light control device or light controller 322 to discriminate between light scattered by and transmitted through liquid crystal display 305. In one embodiment light control device 322a (FIG. 13) primarily is a mask 323, and in a second embodiment light control device 322b (FIG. 14) is an aperture 324. In either case, light control device 322 selects scattered or transmitted light for projection. Operation of several projector embodiments disclosed herein generally follows the lens formula $$\frac{1}{S_1} + \frac{1}{S_2} = \frac{1}{f}$$

Although such formula applies to thin lenses, it will be apparent to those having ordinary skill in the art that similar properties and operational constraints will apply to thick lenses and to multiple lens systems, which are contemplated as included in the invention.

Light source 319 is located at a focal point of the collimating lens 320 so that such lens produces a collimated light output 325 directed at liquid crystal display 305. Collimated light 325 incident on portions of liquid crystal display 305 in field-on, optically transmissive condition, will be transmitted through display 305 and will continue as transmitted collimated light 326 to projection lens 321. The projection lens focuses such transmitted collimated light 326 at a focal point 327.

Collimated light 325 incident on liquid crystal material 311 in the field-off, curvilinearly aligned, distorted, etc., in any event generally isotropic scattering mode or structural alignment, will tend to be scattered. Such scattered light is represented at 328 in FIG. 12. Such scattered light 328 may or may not be received by lens 321. If received, such scattered light will tend to be projected by lens 321 toward light control device 322 but in general will not be focused at the focal point 327. Scattering of light by liquid crystal display 305 occurs primarily due to the difference between the index of refraction of support/containment medium 310 and the extraordinary index of refraction of the liquid crystal material itself. (Optical transmission through display 305 without scattering is maximized when the ordinary index of refraction of the liquid crystal material and the index of refraction of the containment/support medium are matched as closely as possible—most preferably are equal.)

Although the volumes of liquid crystal material 311 may be arranged in one or more substantially continuous layers throughout liquid crystal display 305, such volumes of liquid crystal material also may be patterned, whereby discrete sections of liquid crystal display 305 would contain such volumes and other sections would not, thereby providing isolation for respective liquid crystal sections. An example of patterning appears in FIGS. 4–5. At least one of the electrodes in display 305 must be patterned, though, for example in the manner of FIGS. 7–9, so an electric field can be applied selectively to respective selected portions of liquid crystal material 311. Electric drive 306 may be a computer with appropriate power output and/or control circuitry of conventional design capable of applying electric potential between respective electrode pairs (such as between electrodes 14a and 13″ in FIG. 8) to produce an electric field across the liquid crystal material 311 between such electrodes. Such electrical drives may be conventional type used to drive optical displays and the like.

Turning, now, particularly to FIG. 13, the light control device 322a includes a mask 323 located at the focal point 327 of the projection lens 321. The collimated light 326 received by the lens 321 is focused at the focal point 327 and simply is blocked by the mask 323. However, the lens 321 projects the scattered light 328 as light 330 out through a light output opening 331 in the projector 300 housing 301 to form the desired viewable image on the projection screen 307. To maximize the amount of scattered light collected, the lens 321 in this embodiment should be as large as is reasonably possible. Additional lenses, mirrors, filters, etc., as may be desired or required, may be employed to complete the function of projecting the light 330 passing out through the opening 331 to form the desired image on the screen 307. Using the projector 300 with the light control device 322a, then, those portions of the liquid crystal display 305 which are transmissive will appear black or dark on the screen 307 and those portions which are in scattering mode will appear relatively bright on the screen 307.

In FIG. 14, now, the light control device 322b includes an aperture 324. The projection lens 321 focuses the collimated light 326 at focal point 327, which is located in the aperture or at least in a position with respect to the aperture 324 so as to permit the passage of all or substantially all of the light focused thereat through the opening 332 for projection onto the screen 307. One or more additional lenses, mirrors or other optical devices may be employed to complete the function of projecting such light passing through the aperture 324 onto the screen 307. However, the scattered light 328 reaching the lens 321 is directed as light 330 onto walls 333 of the projector 300 housing 301 and/or walls bounding the aperture and, in any event, is blocked from being transmitted through the aperture opening 332. Preferably the mask 323 (FIG. 13) and the walls 333 are optically absorbent, for example including black paint, black felt, or other material to absorb light incident thereon, therefore preventing the reflection of spurious light back into the interior 334 of the projector housing. In fact, all of the interior walls of the projector housing 301 may be black or otherwise light absorbent to minimize spurious light therein.

In operation of the projector 300 employing the light control device 322b, then, those portions of the liquid crystal display 305, which are in the field-on, light transmitting mode, will appear bright on the screen 307; whereas those portions of the liquid crystal display 305 which are in the scattering mode will appear relatively dark on the screen 307. As was mentioned above, the lens formula $$\frac{1}{S_1} + \frac{1}{S_2} = \frac{1}{f}$$

generally applies. $S_1$ is the object distance, i.e. the distance of the display 305 from the lens 321; $S_2$ is the image distance, i.e. the distance of the screen 307 from the lens; and f is the focal length of the lens.

The electric drive 306 may be a conventional computer, such as a microcomputer, with appropriate power, drive, isolation, etc. circuitry connectable to the respective electrodes of the display 305 selectively to apply or not to apply an electric field to corresponding respective portions of the liquid crystal material 311. The drive 306 may be controlled by a person selectively to change the particular image on the liquid crystal display 305 e.g. by making manual adjustments such as closing switches to respective circuits that apply voltage to respective electrodes, or by programming and operating the computer of the drive. For example, if a lecturer were using the projector 300 during the course of a lecture, by operating the electric drive 306 periodically the lecturer could change the particular images, and, therefore, the information projected onto the projection screen 307. Alternatively, the electric drive 306 may operate automatically sequentially to change the image projected on the projection screen 307, and, if desired, the electric drive 306 may operate in a relatively rapid fashion to cause the rapid changing of the image and, therefore, the effect of a moving picture projected on the screen 307.

Various conventional support means (not shown) may be employed in the projector 300 as well as in the other projectors described below with respect to FIGS. 15 and 16, to support the various components of the projector in the housing 301 or in any event with respect to such housing or with respect to each other. Examples would be a socket for the lamp of the light source 319, lens holders for the lenses 320, 321, a support frame, such as a holder, or transparent substrate, such as a sheet of glass, plastic, Mylar film, etc. for the liquid crystal display 305, and so on. Appropriate electrical connections (not shown) also would be apparent to those having ordinary skill in the art, such as, for example, power connections to the light source 319 and electrical connections, represented at 335, between the electric drive 306 and the several electrodes of the liquid crystal display 305. Moreover, adjustability of the light output 336 from the projector 300 may be effected by appropriate adjustability of the size of the mask 323, of the opening 331, and/or of the opening 332 in the aperture 324.

Advantages of the projector embodiment of FIG. 13 in particular are the ability to use a display 305 that produces a relatively small amount of scattering in field off condition—therefore the display can be relatively thin; and the ability accurately to control with facility the so-called turn on characteristics of the display and projector using same. These advantages facilitate multiplexed operation or driving of the multiple pixels, for example, in a relatively large size display with a minimum number of drive circuits being required to effect desired driving.

The illustrations in FIGS. 15A and 15B demonstrate such advantages of the projector 301 of FIG. 13. In FIG. 15A is a profile 340 showing how much light may be scattered in respective directions on one side of the display 305 when in field off condition. Much of the scattered light is transmitted through lens 321 and opening 331, but some scattered light is scattered away from the opening 331 and is blocked by the housing wall 333. As electric field is applied to the liquid crystal display 305, the cone of light 341 on the profile 340 will tend to collapse, e.g. as is shown at 341, and the amount of scattered light, i.e. intensity, exiting the opening 331 will increase. The general increase in intensity of projected light through opening 331 as a function of voltage or electric field magnitude is represented by curve 343 in FIG. 15B, particularly at the lefthand portion 344 of the curve. The change in intensity at curve portion 344 is relatively gradual, and in any event over the extent thereof light will be transmitted through the opening 331.

However, when adequate voltage $V_t$ is applied to liquid crystal in the display a very rapid transition occurs in the liquid crystal alignment, i.e. so as to become substantially transparent, whereupon the transmitted light therefrom is focused on the mask 323 and does not pass through opening 331. Such rapid transition is represented in FIG. 15B at curve portion 345 which has a much steeper slope than does curve portion 344.

Multiplexed operation of the display 305 may be carried out by selectively applying or not a positive potential or voltage on one electrode or electrode portion (say electrode 14a, FIG. 8) and by selectively applying or not a negative potential or voltage to the other electrode or electrode portion (say electrode 13", FIG. 8). When a voltage is applied to either one of the electrodes but not to the other a change in intensity of light transmitted through opening 331 may occur in response to the continued scattering of light by liquid crystal between such electrodes. However, when positive voltage is applied to one electrode and negative voltage is applied to the other, then adequate potential difference/electric field occurs across the liquid crystal between those electrodes to achieve the desired transition to transparent condition (curve portion 345). The transmissive, field on liquid crystal then will appear dark on screen 307 since light transmitted by such liquid crystal is focused on the mask or stop 323.

Referring to FIG. 16, the preferred embodiment and best mode of the invention in the form of a liquid crystal projector 350 is shown. The projector 350 includes a modified housing 351 containing the projector optics 352, including a light input portion 353 and a light output portion 354. The light input portion 353 includes a light source 319 and a Fresnel lens 355, and the light output portion 354 includes an aperture 356, a reflector 357, and a projection lens 358. The reflector 357 and projection lens 358 are positioned in a housing or frame portion 360 optically downstream of the aperture 356, which is mounted in the housing 351. The reflector 357 is provided to fold the optical path of the liquid crystal projector 350 and thereby to reduce the size and/or general structural configuration of the projector relative to, for example, the straight through projector 300 shown in FIG. 12.

The light source 319 is located at one principal point or focus of the Fresnel lens 355, and the aperture 356 is located at the opposite principal point or focus 361 of the Fresnel lens 355. Therefore, in the absence of any optical disturbance, light from the source 319 traveling along the optical path 362 and received by the Fresnel lens 355 will be focused at the focal point 361 in the aperture or proximate the aperture 356. Moreover, the light transmitted through the aperture 356 will be reflected by the reflector 357 toward the projection lens 358 and will be projected by the latter onto the screen 307, for example to form an image thereon.

The display 305 is mounted preferably in parallel and in proximity to the Fresnel lens 355 and also is mounted in the object plane of the lens 321, i.e. a distance $S_1$ from the lens according to the above formula requirements. Preferably the effect of the index of refraction of the display 305 will not detrimentally affect the light focused by the Fresnel lens 355 at the aperture 356 unless liquid crystal in the display is in the scattering mode.

In operation of the liquid crystal projector 350, then, the electric drive 306 operating through the interconnection 335 to the liquid crystal display 305 applies an electric field, for example, to selected portions of the display and does not apply an electric field to other portions. Those portions in which the field is applied will be optically transmissive, and the other portions will operate in a scattering mode, as aforesaid. The light transmitted through the display 305 will be focused at the focal point 361 of the Fresnel lens 355 in the aperture 356. Such light, moreover, will be reflected by the reflector 357 and projected by the lens 358 onto the screen 307 to form bright areas of an image thereon. On the other hand, those portions of the liquid crystal display 305 which tend to scatter light, will scatter such light generally isotropically preferably over 4 pi steradians and, in any event, substantially most of such light will be scattered away from or so as not to pass through the aperture 356 and instead will be absorbed by the walls or material associated with, lining, etc. the housing 351.

A particular advantage to the liquid crystal projector 350 is the positioning of the liquid crystal display 305 generally in a horizontal plane; and such liquid crystal display or, alternatively, a further optically transparent medium, such as a plastic sheet, glass plate, etc., may be positioned over the liquid crystal display and provide a surface on which a person could write information for projection onto the screen 307 in the same way that conventional overhead projectors are employed to project an image manually written in real time onto the surface of a transparency. To permit access to such surface or, alternatively, to the top surface 305a of the liquid crystal display on which information could be written manually, an appropriate opening may be provided in the projector housing 351. For example, what are illustrated in FIG. 16 as closed or solid walls 363 of the housing 351 may in fact be frame-like members intended to position the aperture 356 and the light absorbing wall surface(s) 364 relative to the focal point 361 while an open area 365 between the structural frame members or simply formed in the housing wall is provided for manual access to the surface 305a or other writing surface mentioned above. Of course, various support members, frame members, structural members, electrical connections, and the like of conventional design, for example, would be employed to position and to mount the various components of the liquid crystal projector 350 generally in the operational relation illustrated in FIG. 16.

A double or compound folded liquid crystal projector 370 according to the invention is illustrated in FIG. 17. The projector 370 includes a housing 371, an optics portion 372 including input optics 373, output optics 374, and a reflector 375, and an electric drive 306. A Fresnel lens 376 is positioned to function as part of each of the input optics 373 and the output optics 374. More specifically, the light source 319 directs light onto the Fresnel lens 376, and that light preferably is collimated by the lens and is directed to the liquid crystal display 305. As to those portions of the liquid crystal display 305 which are in an aligned, field-on, optically transmitting mode, the same being determined by electric drive 306, which is shown as a computer coupled by an electrical connector 377 to the electrodes of the display 305, as aforesaid, such collimated incident light will transmit through to the reflector 375 and be reflected back through the transmitting liquid crystal portion to the Fresnel lens 376. The Fresnel lens 376 focuses such reflected light as part of the output optics 374 to an aperture 380, which is located at the focal point 381 of the Fresnel lens. Such focused light, then, is reflected by a reflector 382 in the output optics to the projection lens 383 which projects the reflected light to form an image on the screen 307. However, light scattered by the liquid crystal display 305 will tend to be scattered isotropically/randomly and such scattered light on reaching the Fresnel lens 376 in general will not be received in a direction perpendicular to the general plane of the lens and, accordingly, will not be focused by the lens at focal point 381.

In operation of the liquid crystal projector 370, then, the electric drive 306 may be operated as aforesaid to create the transmitting portions of the display 305, while other portions of the display may be in the scattering mode. Those portions of the display 305 in the transmitting mode will result in production of bright areas projected onto the screen 307, while other areas of the display 305 which are scattering will appear representatively relatively dark on the screen 307. The liquid crystal projector 370 also has the convenience of relatively low profile and overall dimensions in view of the double or compound folded optical path therein. However, if desired, an additional glass plate, plastic sheet, etc. may be placed for support above the upper surface of the Fresnel lens 376 to provide a surface on which information manually can be written during use of the projector 370. In such case, access, e.g. an opening or door 384 in the housing 371, would be provided for a person to insert a hand and writing implement into the housing or frame structure 371 of the projector 370 to permit such writing.

The liquid crystal display may be as small as 35 mm or 16 mm or may be 8½"×11" or larger. The liquid crystal volumes may be over the entire display and may require a patterned electrode. Patterned liquid crystal may be used or full area coverage by the liquid crystal may be used in the liquid crystal display 305 of the projector. Contrast is a function of f number. Black areas will be black as function of f number and scattering; the higher the f number the darker the black on screen 307 because less light is collected by the lens 383. Clear area brightness will not be a function of f number because in focus, i.e. in the focal plane of projector lens.

Briefly referring to FIG. 18, a liquid crystal display 400 for use with the several projectors of the invention is shown in conjunction with an electric drive 306. The display 400 has dye 401 therein. Such dye is represented schematically. However, it will be appreciated that such dye 401 may be pleochroic dye in the liquid crystal to reduce transmission and scattering in the field-off condition; may be a non-pleochroic one color dye in the liquid crystal or in the contact/support medium to color light; or may be several non-pleochroic dyes of several different colors located in different portions of the display to provide a multicolor output tending to effect a tinting or coloring form of light projected by the projector using such display 400.

Using the circuitry illustrated in FIG. 18, then, various pixel-like areas, such as those identified 401R, 401G, 401B in the display 400 selectively can be addressed to apply or not to apply an electric field thereacross. Depending on which pixels are energized and which are not, light transmitted through the display 400 may be colored so that the resulting output of light projected by a projector using such display 400 will provide a color output. Moreover, if the pixels in the display 400 are adequately small, the same may in effect be additive in the coloring effect on the projected light. Accordingly, various colors may be produced by having more than one of such pixels energized or not at any given time. Such additive coloring may be considered analogous to that which occurs in a conventional color television in which selected color dots or pixels are selectively energized, and ordinarily only three different colors are required to produce virtually any color output, as is known in this color optics field.

Turning now to FIGS. 19 and 20, a further embodiment of the preferred projector of the invention having color capability is represented at 450. The various components of the projector 450 in FIG. 19 are substantially the same in form and function as those illustrated and described above with respect to the projector 350 illustrated in FIG. 16. However, in the projector 450 there is located at the aperture 356 a color filter type device 451, which may be operatively controlled by the electric drive 306 connected by connection 335a to color or not light transmitted through the liquid crystal display 305 and focused by the Fresnel lens 355 onto the aperture 356.

The color filter type device 451 is shown in plan view in FIG. 20 having respective red, green and blue pie-shape sectors 452R, 452G, 452B. Each sector preferably is comprised of liquid crystal display material the same as or similar to that used for the liquid crystal display 355; however, each individual sector of the filter 451 is dyed a respective color. More specifically, the filter 451 may be formed of operationally nematic liquid crystal material contained in plural volumes formed in a containment medium. Non-pleochroic dye preferably is provided, for example by imbibition or otherwise, in the liquid crystal material and/or containment medium in the respective colored sectors. Electrodes positioned on opposite sides of the filter 451 may be energized selectively by the electric drive 306 to apply an electric potential across any one or more of the sectors causing the same to become generally optically transparent, but nevertheless capable of tinting or coloring light transmitted therethrough. In operation, then, if the red sector 452R had an electric field applied across it to make the same relatively transparent, while the green and blue sectors 452G, 452B were not energized, light transmitted through the aperture 356 and projected by the lens 358 would be tinted or colored red. Similar operation could occur by exclusively energizing one of the green or blue sectors 452G, 452B to effect green or blue coloring of the projected light. Additive coloring could occur, too, by energizing two or three of the sectors in the filter 451. As to those segments 452 which are not energized and optically transmissive, the same will tend to scatter light which primarily will not be collected by the lens 358 for projection onto the screen 307; although some of such scattered light may be collected and transmitted, nevertheless the amount of that light would be relatively small compared to that transmitted through the energized sector and, accordingly, would have minimal effect on the color projected onto the screen 307. Also, if desired, an additional undyed sector may be included in the filter 451 to facilitate transmitting white light to the lens 358 for projection onto the screen 307. It will be appreciated that the electric drive 306 may change selectively the portions or pixels of the liquid crystal display 305 and can coordinate the same with selected operation of the filter 451 thereby to produce single color or multicolored images, either still or moving, for projection by the lens 358 onto the screen 307.

It will be appreciated that the projector 450 provides control of the optical characteristics of an image projected onto a relatively large screen by using a relatively small size light control shutter which preferably has one or more different color sectors or segments. Thus, a relatively large area of output light, i.e. the image projected onto the screen 307, can be chopped or controlled by a relatively small area shutter 451, and using only three different colored sector portions 452 of the filter 451, more than three color outputs can be obtained.

STATEMENT OF INDUSTRIAL APPLICATION

The invention may be used, inter alia, to project a light image of characteristics created in a liquid crystal optical display.

I claim:

1. A projector, comprising liquid crystal means selectively operable for affecting light incident thereon by selectively primarily scattering or transmitting light in repsonse to a prescribed input, and optical means for selectively projecting light that is affected or not affected by said liquid crystal means, said optical means comprising discriminating means for discriminating between light scattered and light transmitted by said liquid crystal means and output meand for projecting as output light the light scattered by said liquid crystal means.

2. The invention of claim 1, said optical means comprising a projection lens having a focal length f, said liquid crystal means being positioned an object distance $s_1$ away from said lens, and said lens being operable to project at an image distance $s_2$ away from said lens an image formed by said liquid crstal means, wherein f, $s_1$, and $s_2$ are at least approximately related by the equation $(1/s_1)+(1/s_2)=1/f$.

3. The invention of claim 1, said volumes of liquid crystal means comprising at least one layer of encapsulated operationally nematic liquid crystal material in said support medium means, the liquid crystal material in said volumes having positive dielectric anisotropy and an ordinary index of refraction substantially matched to that of said support medium means to maximize optical transmission in the presence of an electric field and to effect substantially isotropic scattering in the absence of an electric field.

4. The invention of claim 3, said liquid crystal material having an extraordinary index of refraction that is different from that of said support medium means to effect such substantially isotropic scattering in the absence of an electric field.

5. The invention of claim 4, further comprising means for applying an electric field to said encapsulated liquid crystal material as such prescribed input.

6. The invention of claim 5, said means for applying comprising electrode means positioned between said support medium means and said layer of encapsulated liquid crystal material for applying an electric field to align said liquid crystal with respect thereto.

7. The invention of claim 6, further comprising electric drive means for delivering electric signals to said electrode means to apply such electric field.

8. The invention of claim 6, at least one of said electrode means comprising a patterned electrode with multiple electrode portions that can be selectively energized to apply electric field to selected portions of said encapsulated liquid crystal material.

9. The invention of claim 1, further comprising pleochroic dye in said liquid crystal means.

10. The invention of claim 1, said optical means comprising input means for supplying incident light to said liquid crystal means.

11. The invention of claim 1, said support medium means comprising containment means for containing discrete quantities of operationally nematic liquid crystal material to distort the same when in random alignment and to permit alignment thereof in the presence of an electric field.

12. The invention of claim 11, further comprising additive means in said operationally nematic liquid crystal material for expediting such distorting and return to random alignment upon the removal of such electric field.

13. The invention of claim 12, said additive means comprising a chiral additive.

14. The invention of claim 1, further comprising a containment medium for holding discrete quantities of such liquid crystal means in respective capsule-like volumes, and a substantially optically transparent support.

15. The invention of claim 14, said substantially optically transparent support comprising a polyester or polycarbonate material.

16. The invention of claim 14, further comprising electrode means for applying an electric field to said liquid crystal means to cause the latter to change from distorted alignment condition distorted in configuration or shape by the wall of such respective capsule-like volumes for scattering light incident thereon to generally parallel alignment condition to transmit light incident thereon.

17. The invention of claim 14, further comprising means reactive with said containment medium means for tending to force at least a portion of at least some of said liquid crystal means into substantially normal alignment with the wall of such capsule-like volumes.

18. The invention of claim 1, further comprising support medium means for supporting and containing volumes of said liquid crystal means, and non-pleochroic dye in at least one of said liquid crystal means and support medium means.

19. The invention of claim 18, wherein non-pleochroic dye of different respective colors is in different respective portions of said at least one of said liquid crystal means and support medium means.

20. The invention of claim 19, further comprising electric drive means for applying electric field to selected areas of said liquid crystal means to create areas of different color for projection by said optical means.

21. The invention of claim 1, wherein said liquid crystal means is operative to form characteristics of an image for projection by said optical means without substantial absorption of energy from light incident on said liquid crystal means.

22. The invention of claim 1, further comprising light source means for supplying light to said liquid crystal means.

23. The invention of claim 1, further comprising drive means for applying an electric field to selected portions of said liquid crystal means for enabling transmission of light through such portions.

24. The invention of claim 1, said liquid crystal means comprising liquid crystal means for selectively primarily scattering or transmitting light in response to a prescribed input, and a support medium means for supporting and containing volumes of said liquid crystal means, said volumes of liquid crystal means comprising at least one layer of encapsulated operationally nematic liquid crystal material in said support medium means, the liquid crystal material in said volumes having positive dielectric anisotropy and an ordinary index of refraction substantially matched to that of said support medium means to maximize optical transmission in the presence of an electric field and to effect substantially isotropic scattering in the absence of an electric field, and said liquid crystal material having an extraordinary index of refraction that is different from that of said support medium means to effect such substantially isotropic scattering in the absence of an electric field.

25. The invention of claim 24, wherein walls of said support medium means bounding said volumes of liquid crystal material tend to distort the natural structure of said liquid crystal material, and further comprising electrode means positioned between said support medium means and said layer of encapsulated liquid crystal for applying an electric field to align said liquid crystal structure with respect thereto.

26. The invention of claim 1, wherein said liquid crystal means is operative to form characteristics of an image for projection by said optical means without substantial absorption of energy from light incident on said liquid crystal means.

27. The invention of claim 1, said liquid crystal means comprising a sheet-like material, and further comprising a fresnel lens positioned in proximity to said sheet-like material.

28. The invention of claim 27, said discriminating means comprising selecting means for selecting between transmitted light and scattered light from said liquid crystal means for projection, and said fresnel lens being positioned with respect to said liquid crystal means for directing incident light from a source of light onto said liquid crystal means and to focus light transmitted through said liquid crystal means at least approximately at said selecting means.

29. The invention of claim 28, said projection means comprising projection lens means for projecting an image created by light scattered by said liquid crystal means.

30. The invention of claim 29, further comprising drive means for selectively determining respective portions of said liquid crystal means for operation in transmitting or scattering mode.

31. A projector, comprising liquid crystal means selectively operable for affecting light incident thereon by selectively primarily scattering or transmitting light in repsonse to a prescribed input, optical means for selectively projecting light that is affected or not affected by said liquid crystal means, said optical means comprising discriminating means for discriminating between light scattered and light transmitted by said liquid crystal means whereby primarily only one of scattered or transmitted is projected by said optical means, and color means for selectively coloring light projected by said optical means.

32. The invention of claim 31, said discriminating means comprising aperture means for transmitting light transmitted by said liquid crystal means and for blocking light scattered by said liquid crystal means, and means for focusing light transmitted by said liquid crystal means into said aperture means for transmission by said aperture means and for projection, and said color means comprising further volumes of liquid crystal material in a containment medium, at least one of said liquid crystal material and said containment medium being colored by non-pleochroic dye to color light passing therethrough.

33. The invention of claim 32, said color means comprising multiple color sections positioned to intersect light directed to said aperture, plural of said sections being of different respective colors, and further comprising means for delivering a prescribed input to one or more respective selected sections of said color means to permit transmission of light therethrough as such light is colored thereby.

34. The invention of claim 32, said liquid crystal material comprising operationally nematic liquid crystal.

35. The invention of claim 31, said liquid crystal means comprising plural volumes of operationally nematic liquid crystal material in a support medium means, the liquid crystal material in said volumes having positive dielectric anisotropy and an ordinary index of refraction substantially matched to that of said support medium means to maximize optical transmission in the presence of an electric field and to effect substantially isotropic scattering in the absence of an electric field, and said liquid crystal material having an extraordinary index of refraction that is different from that of said support medium means to effect substantially isotropic scattering in the absence of an electric field.

36. The invention of claim 35, said support medium means comprising containment means for containing discrete quantities of operationally nematic liquid crystal material to distort the same when in random alignment and to permit alignment thereof in the presence of an electric field.

37. The invention of claim 35, further comprising non-pleochroic dye in at least one of said liquid crystal means and support medium means.

38. The invention of claim 37, wherein non-pleochroic dye of different respective colors is in different respective portions of said at least one of said liquid crystal material and support medium means.

39. The invention of claim 35, said liquid crystal means being operable to transmit or to scatter light independently of the direction of polarization of light incident thereon.

40. The invention of claim 35, further comprising pleochroic dye in said liquid crystal means.

41. The invention of claim 35, further comprising input means for supplying incident light to said liquid crystal means.

42. The invention of claim 35, said support medium means comprising a containment medium means for holding discrete quantities of such liquid crystal means in respective capsule-like volumes, said support medium means further comprising a substantially optically transparent support.

43. The projector of claim 31, said optical means having an image plane, said color means comprising multiple color sections positioned out of such image plane to intersect light directed for projection to said image plane by said optical means, plural of said sections being of different respective colors or non-colored, and said sections being selectively operable to transmit light or to scatter light.

44. The projector of claim 43, said optical means being operative to project light transmitted through said color means and primarily not to project light scattered by said color means whereby the color of projected light is a function of the coloring effected by one or more of said multiple color sections.

45. The projector of claim 44, said liquid crystal means being in the image plane of said optical means, said optical means comprising focusing means for focusing light transmitted through said liquid crystal means toward a focal point, and said color means being positioned in the path of light directed through said optical means.

46. The projector of claim 45, said discriminating means comprising aperture means for transmitting light transmitted by said liquid crystal means and for blocking light scattered by said liquid crystal means, said focusing means being positioned to focus light at or proximate said aperture means, and said color means being operative to color light transmitted therethrough and through said aperture means and said aperture means being operative primarily to block light scattered by said color means.

47. The projector of claim 46, said optical means comprising projection means for projecting light transmitted through said aperture means and through said color means.

48. The projector of claim 31, said liquid crystal means comprising liquid crystal and a support medium means for at least one of supporting and containing volumes of said liquid crystal, said color means comprising dye in at least one of said liquid crystal and support medium means.

49. The projector of claim 48, said dye comprising pleochroic dye in said liquid crystal.

50. The projector of claim 48, said dye comprising non-pleochroic dye.

51. The projector of claim 50, wherein non-pleochroic dye of different respective colors is in different respective portions of said at least one of said liquid crystal and support medium means.

52. The projector of claim 51, further comprising electric drive means for applying electric field to selected areas of said liquid crystal to create areas of different color for projection by said optical means.

53. The projector of claim 52, said optical means having an image plane, said color means further comprising multiple color sections positioned out of such image plane to intersect light directed for projection by said optical means, plural of said sections being of different respective colors or non-colored, and said sections being selectively operable to transmit light or to scatter light.

54. The projector of claim 53, said optical means being operative to project light transmitted through said color means and primarily not to project light scattered by said color means, whereby the color of projected light is a function of the coloring effected by said dye in said liquid crystal means and the coloring effected by one or more of said multiple color sections.

55. The projector of claim 54, said optical means comprising focusing means for focusing light transmitted through said liquid crystal means toward a focal point, said color means being positioned in the path of light directed through said optical means.

56. The projector of claim 55, said discriminating means comprising aperture means for transmitting light transmitted by said liquid crystal means and for blocking light scattered by said liquid crystal means, said focusing means being positioned to focus light at or proximate said aperture means, and said color means being operative to color light transmitted therethrough and through said aperture means and said aperture means being operative primarily to block light scattered by said color means.

57. The projector of claim 56, said optical means comprising projection means for projecting light transmitted through said aperture means and through said color means.

58. A projector, comprising liquid crystal means selectively operable for affecting light incident thereon, and optical means for selectively projecting light affected or not affected by said liquid crystal means, said liquid crystal means being operative to at least one of scatter or absorb light in the absence of a presceribed input and transmit light incident thereon in response to a prescribed input applied thereto, said optical means comprising input means for directing light to said liquid crystal means and output means for projecting as output light one of the light scattered or the light transmitted by said liquid crystal means, said output means comprising discriminating means for discriminating between light scattered and light transmitted by said liquid crystal means, and projecting means for projecting light received from said discriminating means, said discriminating means comprising an optical stop, and said projecting means comprising means for focusing light transmitted thorugh said liquid crystal means onto said stop for blocking thereby and for directing light scattered by said liquid crystal means for projection.

59. The invention of claim 58, said input means comprising collimating means for directing collimated light as incident light to said liquid crystal means.

60. The invention of claim 59, said input means further comprising a light source for providing light to said collimating means.

61. The invention of claim 58 further comprising housing means for housing said liquid crystal means and said optical means, said housing means also including wall means for blocking passage therethrough of some of the light scattered by said liquid crystal means.

62. The invention of claim 58, said liquid crystal means comprising a sheet-like material, and said input means comprising a fresnel lens positioned in proximity to said sheet-like material.

63. The invention of claim 62, said discriminating means comprising selecting means for selecting between transmitted light and scattered light from said liquid crystal means for projection, and said fresnel lens being positioned with respect to said liquid crystal means for directing incident light from a source of light onto said liquid crystal means and to focus light transmitted through said liquid crystal means at least approximately at said selecting means.

64. The invention of claim 63, said liquid crystal means comprising liquid crystal means for selectively primarily scattering or transmitting light in response to a prescribed input, and a support medium means for supporting and containing volumes of said liquid crystal means, said volumes of liquid crystal means comprising at least one layer of encapsulated operationally nematic liquid crystal material in said support medium means, the liquid crystal material in said volumes having positive dielectric anisotropy and an ordinary index of refraction substantially matched to that of said support medium means to maximize optical transmission in the presence of an electric field and to effect substantially isotropic scattering in the absence of an electric field, and said liquid crystal material having an extraordinary index of refraction that is different from that of said support medium means to effect such substantially isotropic scattering in the absence of an electric field.

65. The invention of claim 64, wherein walls of said support medium means bounding said volumes of liquid crystal material tend to distort the natural structure of said liquid crystal material, and further comprising electrode means positioned between said support medium means and said layer of encapsulated liquid crystal for applying an electric field to align said liquid crystal structure with respect thereto.

66. The invention of claim 58, further comprising light source means for supplying light to said liquid crystal means.

67. The invention of claim 58, further comprising drive means for selectively determining respective portions of said liquid crystal means for operation in transmitting or scattering mode.

68. The invention of claim 58, further comprising housing means for supporting said liquid crystal means and optical means.

69. The invention of claim 68, said housing means comprising access means for permitting manual access to at least the proximity of said liquid crystal means for writing thereon or in proximity thereto to permit projecting of such writing.

70. The invention of claim 68, said housing comprising an enclosure for preventing undesired release of light therefrom.

71. The invention of claim 58, wherein said liquid crystal means is operative to form characteristics of an image for projection by said optical means without substantial absorption of energy from light incident on said liquid crystal means.

72. A projector, comprising liquid crystal means selectively operable for affecting light incident thereon, and optical means for selectively projecting light affected or not affected by said liquid crystal means, said liquid crystal means being operative to at least one of scatter or absorb light in the absence of a prescribed input and transmit light incident thereon in response to a prescribed input applied thereto, said optical means comprising input means for directing light to said liquid crystal means and output means for projecting as output light one of the light scattered or the light transmitted by said liquid crystal means, said output means comprising discriminating means for discriminating between light scattered and light transmitted by said liquid crystal means, and projecting means for projecting light received from said discriminating means, said discriminating means comprising aperture means for transmitting light transmitted by said liquid crystal means and for blocking light scattered by said liquid crystal means, said projecting means comprising means for focusing light transmitted by said liquid crystal means onto said aperture means for transmission by said aperture means and for projection, and further comprising housing means for housing said liquid crystal means and said optical means, said housing means also including wall means for blocking passage therethrough of light scattered by said liquid crystal means.

73. The invention of claim 72, said input means comprising lens means on one side of said liquid crystal means for directing light into said liquid crystal means, and reflector means on the opposite side of said liquid crystal means for reflecting light transmitted through said liquid crystal means back into said liquid crystal means, and said lens means including means for focusing light to said output means.

74. The invention of claim 73, said lens means comprising a fresnel lens.

75. The invention of claim 74, said output means comprising selecting means for selecting between transmitted light and scattered light from said liquid crystal means for projection, and said fresnel lens being positioned with respect to said liquid crystal means for directing incident light from a source of light onto said liquid crystal means and to focus light transmitted through said liquid crystal means at least approximately at said selecting means.

76. The invention of claim 75, said selecting means comprising aperture means positioned at least approximately at the focus of said fresnel lens for transmitting light focused there by said fresnel lens, and means for blocking light not so focused by said fresnel lens.

77. The invention of claim 72, further comprising pleochroic dye in said liquid crystal means.

78. The invention of claim 72, said optical means comprising a projection lens having a focal length f, said liquid crystal means being positioned an object distance $s_1$ away from said lens, and said lens being operable to project at an image distance $s_2$ away from said lens an image formed by said liquid crystal means, wherein f, $s_1$, and $s_2$ are at least approximately related by the equation $(1/s_1)+(1/s_2)=1/f$.

79. The invention of claim 72, further comprising color means for selectively coloring light projected by said output means.

80. The invention of claim 79, said discriminating means comprising aperture means for transmitting light transmitted by said liquid crystal means and for blocking light scattered by said liquid crystal means, and means for focusing light transmitted by said liquid crystal means onto said aperture means for transmission by said aperture means and for projection, and said color means comprising further volumes of liquid crystal material in a containment medium being colored by non-pleochroic dye to color light passing therethrough.

81. The invention of claim 80, said color means comprising multiple color sections positioned to intersect light directed to said aperture, plural of said sections being of different respective colors, and further comprising means for delivering a prescribed input to one or more respective selected sections of said color means to permit transmission of light therethrough as such light is colored thereby.

82. The invention of claim 80, said liquid crystal material comprising operationally nematic liquid crystal.

83. A projector, comprising liquid crystal means operable in response to a selectively applied prescribed input selectively to affect light incident thereon to form characteristics of an image, and optical means for selectively projecting light that is affected or not affected by said liquid crystal means to form an image, and wherein said liquid crystal means is operational to form such characteristics of such an image without substantial absorption of energy from light incident on said liquid crystal means.

84. An optical filtering device, comprising optical means for directing light along an optical path, aperture means for discriminating between light directed for passage therethrough and light not directed for passage therethrough, and optical filter means positioned in the path of light directed through said aperture means for selectively coloring light, said optical filter means comprising plural volumes of liquid crystal material in a containment medium operative selectively to transmit or to scatter light, at least one of said liquid crystal material and said containment medium being colored by dye to color light transmitted therethrough.

85. The device of claim 84, said optical means comprising focusing means for focusing light at a focal point at or proximate said aperture means for transmission through said aperture means, and said color means being positioned in the path of said light focused by said focusing means prior to said aperture means.

86. The device of claim 85, said optical means further comprising projecting means for projecting light transmitted through said aperture means.

87. The device of claim 85, said color means comprising multiple color sections positioned to intersect light directed to said aperture means, plural of said sections being of different respective colors.

88. The device of claim 87, further comprising means for delivering a prescribed input to one or more respective selected sections of said color means to permit transmission of light therethrough as such light is colored thereby.

89. The device of claim 88, wherein at least one of said sections does not include dye and is substantially completely transparent in the presence of such prescribed input.

90. The device of claim 87, said liquid crystal material comprising operationally nematic liquid crystal.

91. An optical filtering device, comprising optical means for directing light along an optical path, said optical means having an image plane, aperture means for discriminating between light directed for passage therethrough and light not directed for passage therethrough, and optical filter means positioned in the path of light directed through said aperture means and out of such image plane for selectively coloring light, said optical filter means comprising liquid crystal apparatus and color means for at least one of coloring or not coloring light transmitted through said liquid crystal apparatus.

92. The device of claim 91, said liquid crystal apparatus comprising liquid crystal material in a containment plural volumes of liquid crystal material in a containment medium operative selectively to transmit or to scatter light, and said color means comprising dye in at least one of said liquid crystal material and said containment medium to color light transmitted therethrough.

93. The device of claim 92, further comprising aperture means for discriminating between light directed for passage therethrough and light not directed for passage therethrough, and said optical means comprising focusing means for focusing light at a focal point at or proximate said aperture means for transmission through said aperture means, and said color means being positioned in the path of said light focused by said focusing means prior to said aperture means.

94. The device of claim 93, said optical means further comprising projecting means for projecting light transmitted through said aperture means.

95. The device of claim 93, said color means comprising multiple color sections positioned to intersect light directed to said aperture means, plural of said sections being of different respective colors, and further comprising means for delivering a prescribed input to one or more respective selected sections of said color means to permit transmission of light therethrough as such light is colored thereby.

96. The device of claim 95, said liquid crystal material comprising operationally nematic liquid crystal.

97. A projector, comprising liquid crystal means selectively operable for affecting light incident thereon by selectively primarily scattering or transmitting light in response to a prescribed input, optical means for selectively projecting light that is affected or not affected by said liquid crystal means, and multiplex drive means for selectively determining which of plural areas of said liquid crystal means is to scatter light and which is to transmit light.

98. The projector of claim 97, further comprising electrode means for selectively applying electric field to respective areas of said liquid crystal means, and said multiplex drive means comprising for selectively supplying to respective electrode means either positive, negative, or effectively no voltage, whereby when both positive and negative voltages are supplied to a respective pair of electrode means proximate a respective area of said liquid crystal means adequate electric field is applied to such area of said liquid crystal means to effect optical transmission condition of such area of said liquid crystal means; and otherwise light will be scattered by such area of liquid crystal means with the extent of scattering being a function of the magnitude or nonexistence of the reduced electric field when the voltages supplied a respective pair of electrode means proximate a respective area of said liquid crytal means are both positive, both negative, or no voltage and either positive or negative, respectively.

99. The projector of claim 97, said optical means comprising discriminating means for discriminating between light scattered and light transmitted by said liquid crystal means and output means for projecting as output light the light scattered by said liquid crystal means.

100. The projector of claim 99, said discriminating means comprising an optical stop, and said output means comprising means for focusing light transmitted through said liquid crystal means onto said stop for blocking thereby and for directing light scattered by said liquid crystal means for projection.

101. The projector of claim 100, further comprising wall means for defining with said optical step an opening through which scattered light is passed for projection.

102. The projector of claim 101, said wall means being operative to block at least some of the light scattered by said liquid crystal means, the amount of scattering and, thus, of such blocked light being a function of the magnitude of electric field applied to said liquid crystal means, whereby the intensity of light transmitted through said opening is variable as a function of such electric field.

103. A method for projecting an image, comprising directing incident light to a liquid cryystal device capable of affecting or not affecting such incident light, selectively applying a prescribed input to such liquid crystal device to cause the same to scatter or to transmit light incident thereon, blocking light transmitted through such liquid crystal device, and projecting light scattered by such liquid crystal device to form an image.

104. The method of claim 103, further comprising selectively coloring such projected image.

* * * * *